July 3, 1951      F. C. VICTORY      2,559,180

JIG GRINDER

Filed Aug. 22, 1950      12 Sheets—Sheet 1

INVENTOR.
FREDERICK C. VICTORY
BY
*John H. Hanrahan*
ATTORNEY

July 3, 1951   F. C. VICTORY   2,559,180
JIG GRINDER

Filed Aug. 22, 1950   12 Sheets-Sheet 2

Fig. 2

INVENTOR.
FREDERICK C. VICTORY
BY
John H Hanrahan
ATTORNEY

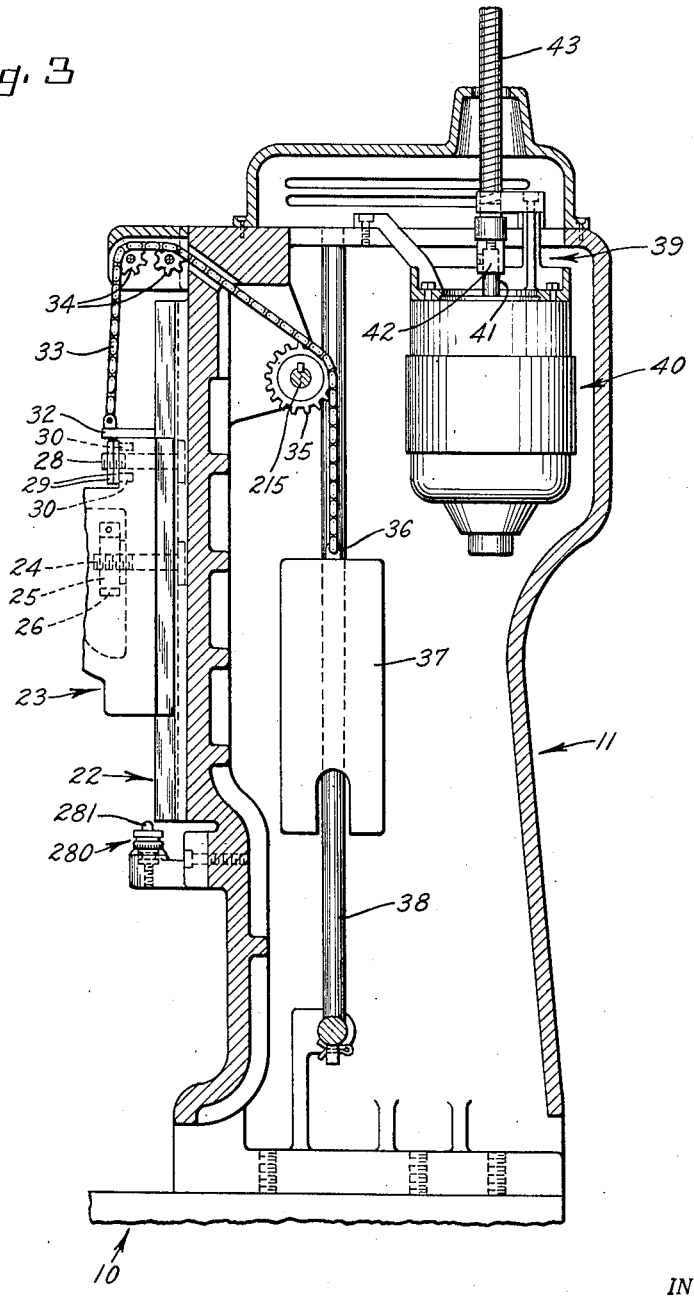

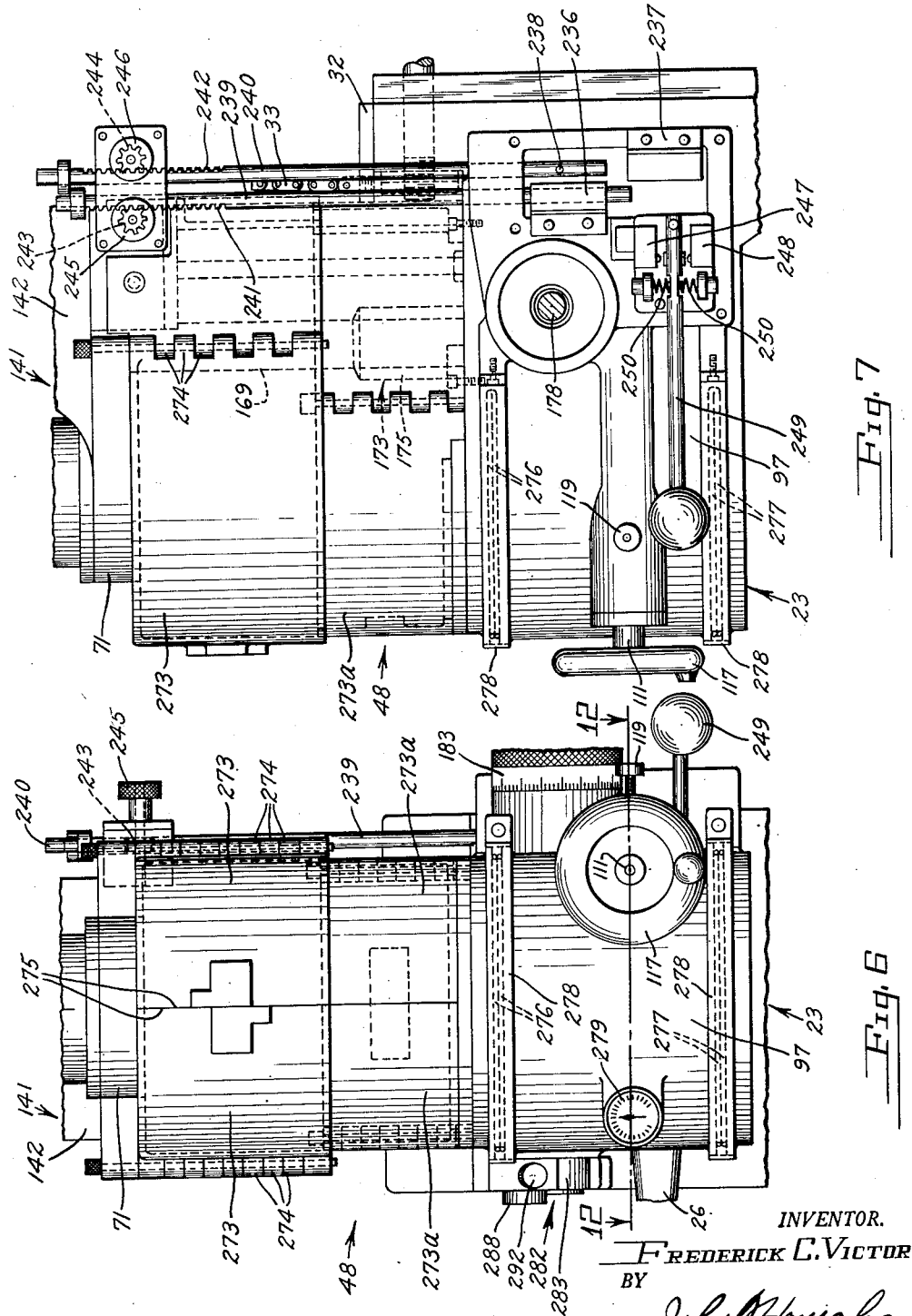

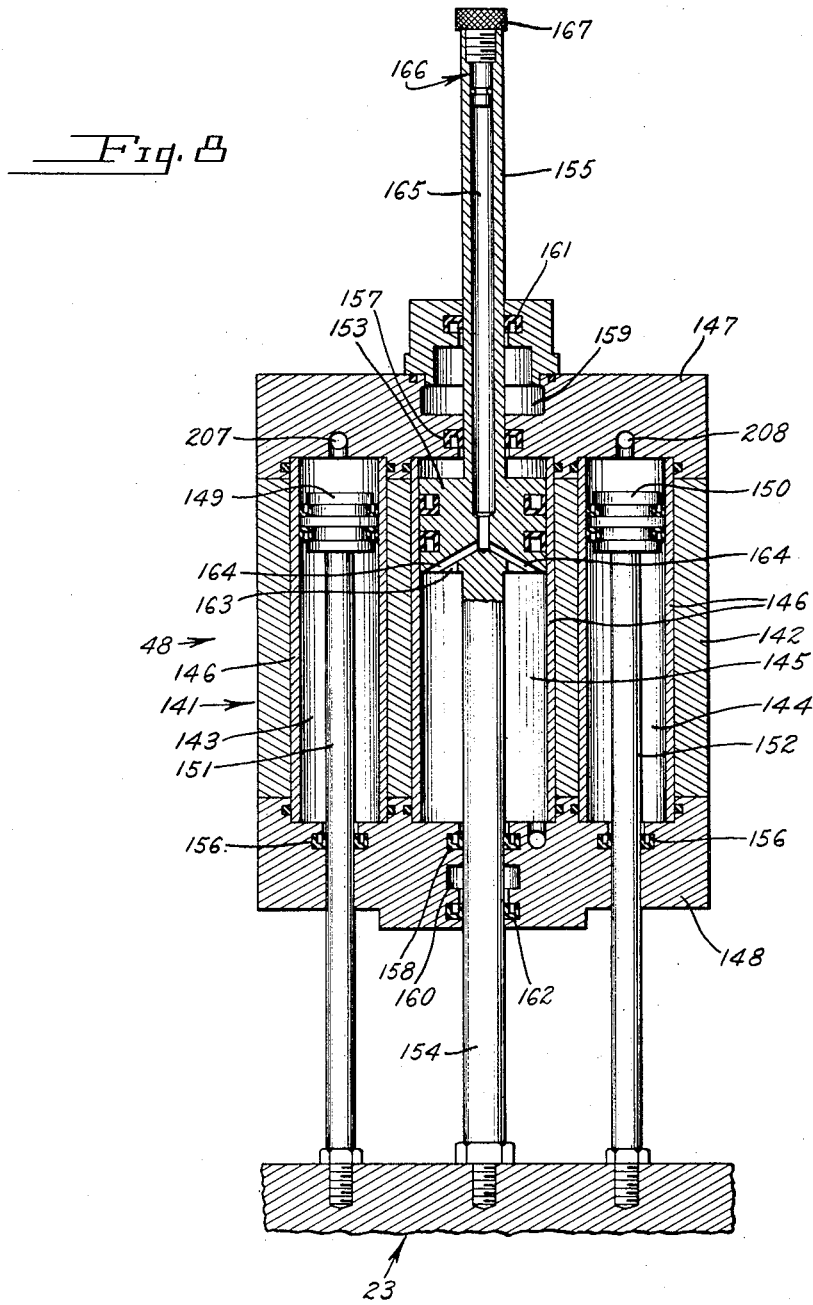

July 3, 1951 F. C. VICTORY 2,559,180
JIG GRINDER
Filed Aug. 22, 1950 12 Sheets-Sheet 7
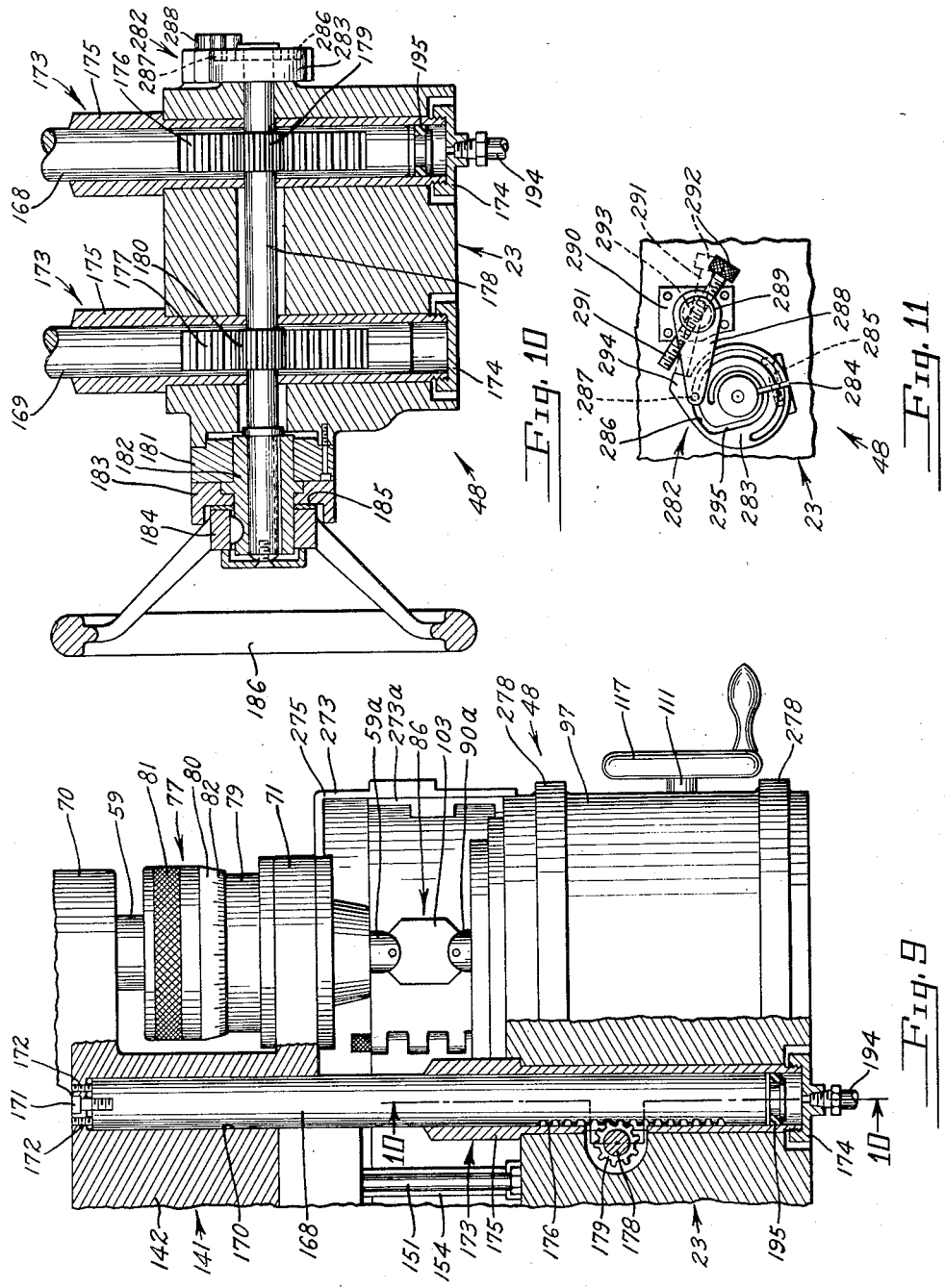
INVENTOR.
FREDERICK C. VICTORY
BY
ATTORNEY July 3, 1951     F. C. VICTORY     2,559,180
JIG GRINDER
Filed Aug. 22, 1950     12 Sheets-Sheet 8
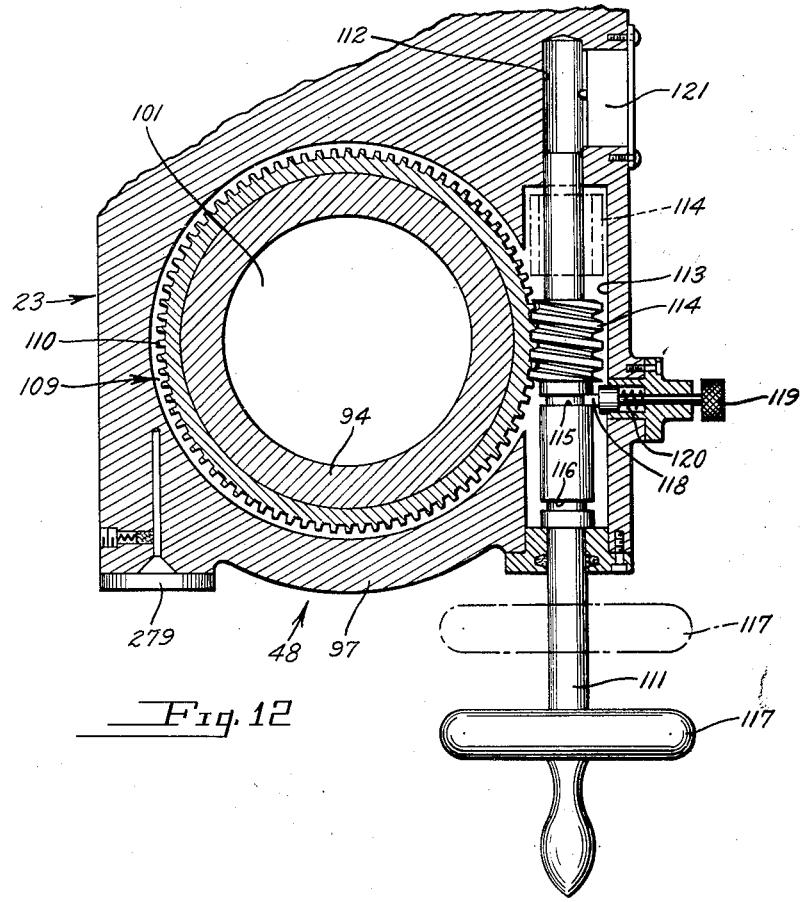
_Fig. 12_
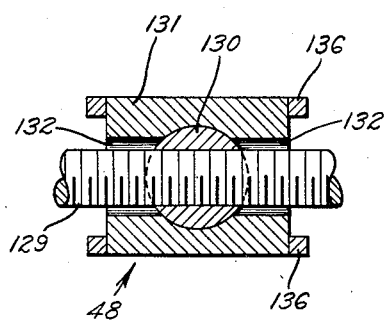
_Fig. 16_
INVENTOR.
FREDERICK C. VICTORY
BY
*John J. Hanrahan*
ATTORNEY

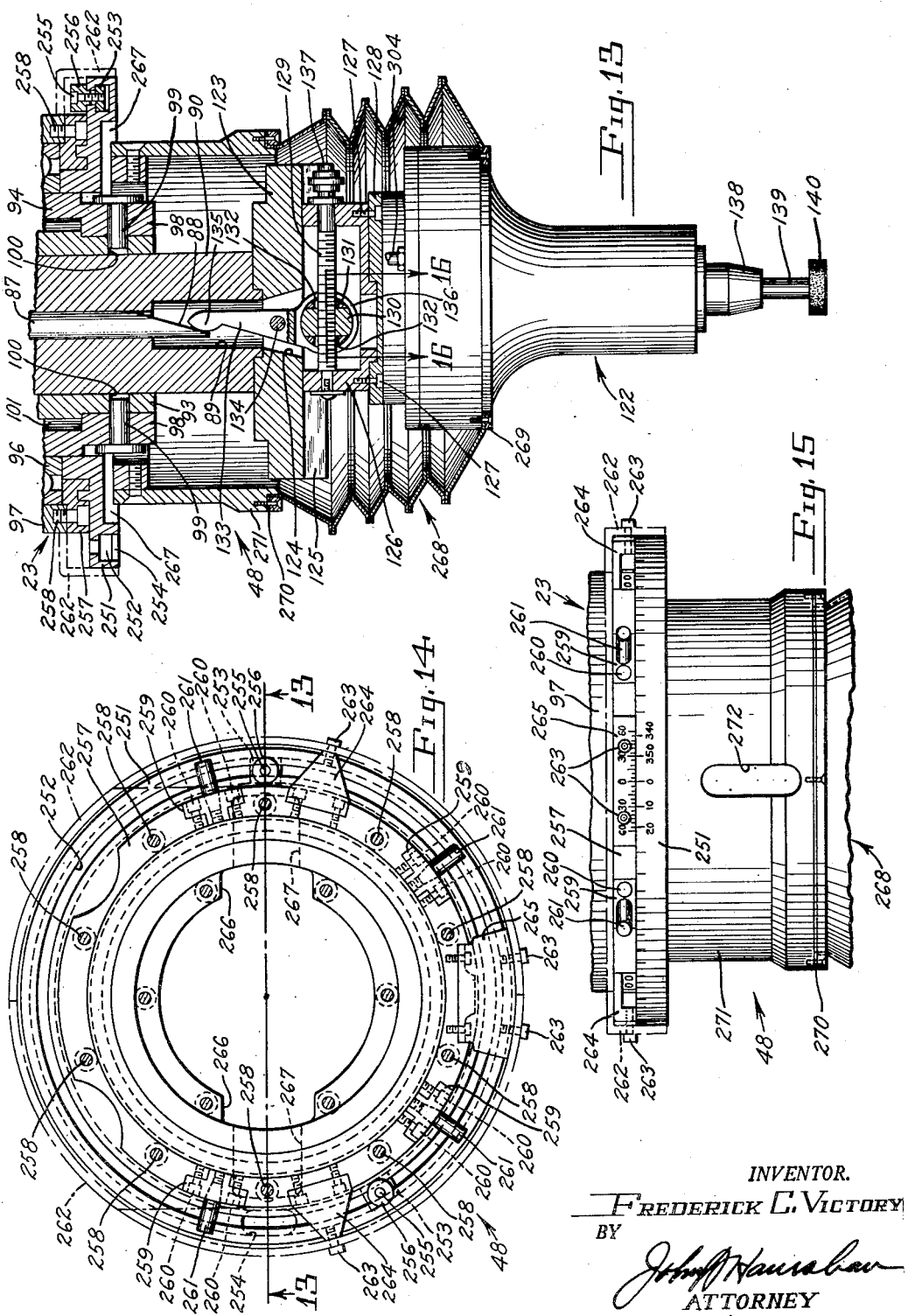

July 3, 1951  F. C. VICTORY  2,559,180
JIG GRINDER
Filed Aug. 22, 1950  12 Sheets-Sheet 10

INVENTOR.
FREDERICK C. VICTORY
BY
ATTORNEY

July 3, 1951

F. C. VICTORY 2,559,180

JIG GRINDER

Filed Aug. 22, 1950

INVENTOR.
FREDERICK C. VICTORY
BY
John J. Hanrahan
ATTORNEY

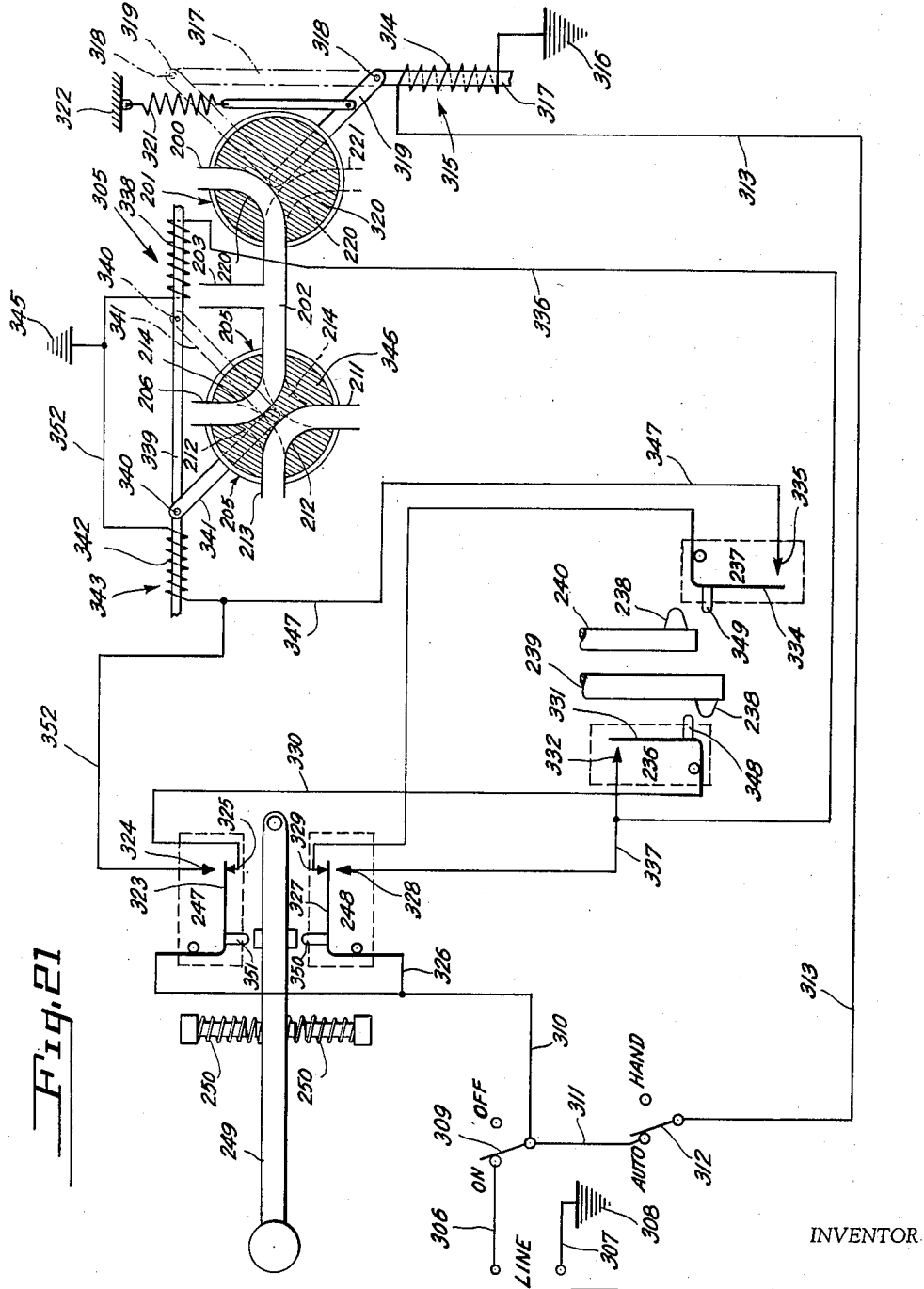

Patented July 3, 1951

2,559,180

UNITED STATES PATENT OFFICE 2,559,180

JIG GRINDER

Frederick C. Victory, Milford, Conn., assignor to Moore Special Tool Co., Inc., a corporation of Connecticut Application August 22, 1950, Serial No. 180,716

26 Claims. (Cl. 51—43)

This invention relates to new and useful improvements in machine tools and has particular relation to a jig grinder.

An object of the invention is to provide a jig grinder of generally improved construction and adapted for use in a wide range of operations.

A further object is to provide a jig grinder including a vertical column having a tool head including a spindle mounted thereon together with means for vertically reciprocating the tool head and including a drive for rotating said spindle, the drive being effected by a motor mounted within the column and connected to drive the spindle through a flexible shaft extending upwardly through the upper end of the column and looped through 180° for driving connection with the spindle whereby the reciprocation of the spindle involves the movements of a minimum of weight and whereby the over-all height of the machine is kept low, a tool holder together with means for rotating the same independent of the spindle being mounted on the lower end thereof.

Another object is to provide a machine tool including a column and a tool head mounted on a side of the column, said tool head including a vertically reciprocable main spindle, means comprising a pair of air operated cylinder and piston constructions for vertically reciprocating the tool head and spindle, and a closed hydraulic system including a third piston and cylinder construction and a passage from one end of the third cylinder to the other thereof externally of the cylinder, a metering orifice being provided in said passage and regulating the speed of movement of the spindle by the pneumatic piston and cylinder constructions.

A further object is to provide a particular hydraulic apparatus useful in the machine tool described and including a cylinder and piston construction, a passage connecting the outer ends of a cylinder of said construction, piston rods extending from each side of the piston and out through the ends of the cylinder, a pair of spaced seals in the cylinder ends and through which each of said rods pass, a chamber about each of said rods between said seals, means maintaining liquid in said chambers under a pressure substantially equal to that developed within the cylinder, and a connection between the system including said chambers and the closed system including said cylinder and piston construction.

Another object is to provide a machine tool having the characteristics indicated and including means for automatically imparting reciprocating movements to the spindle at selected and variable speeds and of selected and variable lengths and also including a manual superimposed over said automatic means for varying the length of the strokes at will.

Another object is to provide a machine tool having the characteristics indicated and including selectively operable means for automatically imparting reciprocating movements to the spindle at selected and variable speeds and also including means whereby the spindle may be manually reciprocated on discontinuance of said automatic means.

An additional object is to provide a machine tool including a vertical column, a mounting block vertically adjustable in said column, a tool head on said block and including a main spindle, means for vertically reciprocating said tool head on said block, means for rotating said main spindle, said last means including a variable speed electric motor, means for disconnecting the drive of said spindle from said motor, and manually operable means then shiftable into driving relation with and manually operable to rotate said spindle.

Another object is to provide a machine tool including a vertical column, a mounting block vertically adjustable on said column, a tool head vertically adjustable with said mounting block and including a main spindle, means for reciprocating said tool head on said mounting block, power means for rotating said spindle, means for disconnecting said power means, other means for then manually rotating said spindle, an adjustable stop means turnable with said spindle and adapted to limit turning movements through a fixed arc.

A further object is to provide a machine tool including a vertical column, a mounting block vertically adjustable on said column, a tool head vertically reciprocable on said block and having a main spindle, pneumatic means for vertically reciprocating said tool head on said block, hydraulic means controlling the rate of reciprocation of said tool head by said pneumatic means, and a cylinder and piston construction for counterbalancing said tool head, a connection from the compressed air supply to said pneumatic means to said cylinder and piston construction and including a regulator valve for maintaining the air in said cylinder at a constant pressure.

Other objects and advantages of the invention will become apparent from a consideration of the following detailed description taken in connection with the accompanying drawings wherein a satisfactory embodiment of the invention is shown. However, it will be understood that the invention is not limited to the details disclosed but includes all such variations and modifications as fall within the spirit of the invention and the scope of the appended claims.

In the drawings:

Fig. 2 is a front elevational view thereof;

Fig. 3 is a vertical central sectional view through the column of the machine;

Fig. 6 is a front elevational view of the midportion of the machine;

Fig. 7 is a side elevational view of said midportion of the machine;

Fig. 8 is a central vertical sectional view through the power means for reciprocating the tool head of the machine;

Fig. 9 is a view partly in section and partly in elevation and showing guiding and counterbalancing means for the reciprocal portions of the machine head;

Fig. 10 is a vertical detail sectional view taken as along the line 10—10 of Fig. 9;

Fig. 11 is a detail elevational view of stop means employed;

Fig. 12 is a detail sectional view showing a hand feed employed;

Fig. 13 is a view partly in elevation and partly in vertical central section and on a somewhat larger scale through the lower portion of the tool head, the part in section being as along the plane of the line 13—13 of Fig. 14;

Fig. 14 is a view taken as looking down onto Fig. 13 with the central portions, comprising the reciprocating spindle, omitted and showing adjustable stop means for use in conjunction with the hand feed means of Fig. 11;

Fig. 15 is a front elevational view of the machine parts of Fig. 14;

Fig. 16 is a detail sectional view taken as along the line 16—16 of Fig. 13 showing part of the means for adjusting the eccentricity of the tool spindle;

Fig. 21 is a schematic view showing the wiring diagram for certain operations.

Figure 1:
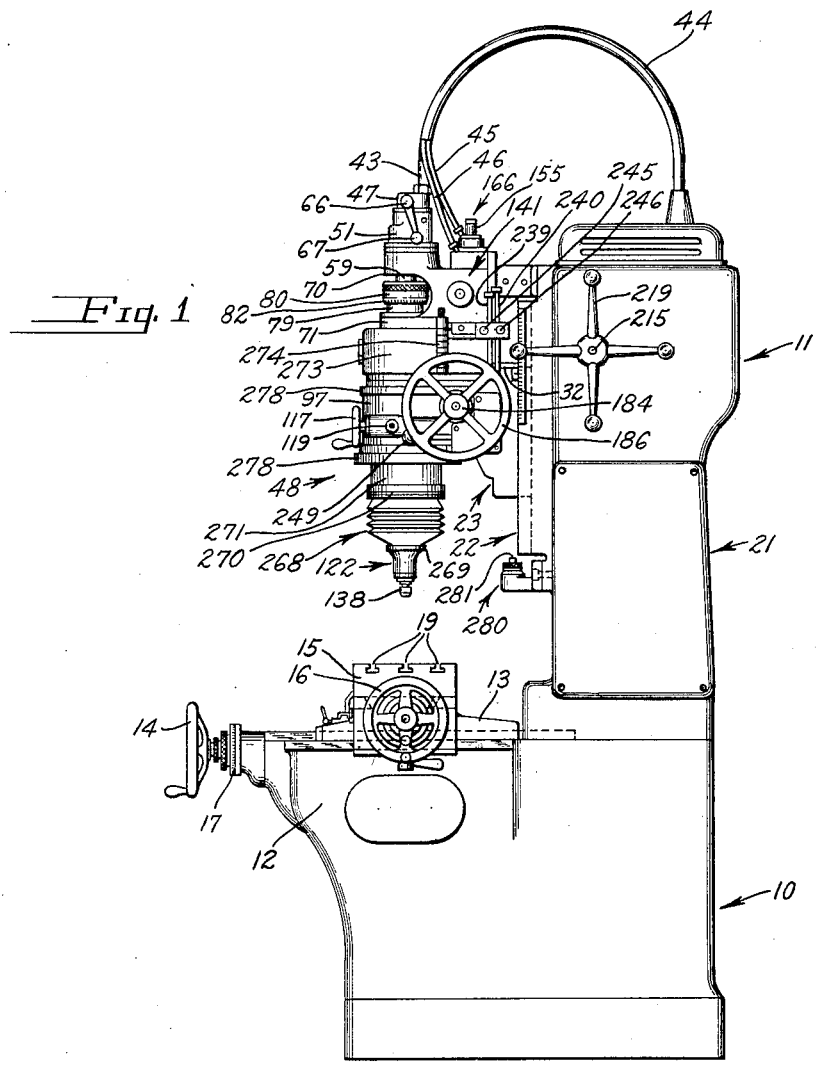
Fig. 1 is a side elevational view showing the machine of the invention.

Referring in detail to the drawings, the improved jig grinder as herein shown includes a base generally designated 10 and integral with and upstanding from the rear portion of which is a column generally designated 11. These parts may be integral. The lower portion of the base 10 is forwardly laterally enlarged providing a portion 12 mounting a saddle 13 adjustable forwardly and rearwardly on the base on manipulation of a hand wheel 14 through any or the usual screw and nut structures.

Slidably mounted on the sadddle 13 for adjustment in directions transverse to those in which the saddle is adjustable, is a table 15 adjustable through any or the usual mechanism, such as a nut and feed screw, on manipulation of a hand wheel 16. Graduated rings or dials 17 and 18 are provided to show adjustments of the saddle and table effected by the hand wheels 14 and 16, respectively. In its upper surface, table 15 is provided with T-slots 19 for the attachment of work clamps. On opposite sides of the column 11 are control boxes 20 and 21 mounting various control elements.

On the forward side of the column 11 are guides 22 providing ways on which a mounting block 23 is vertically adjustable. A T-bolt 24 movable with the block 23 has its head located in a T-slot in the guide 22 and on the shank of said bolt is threaded a nut or nut-like means 25 fixed to a handle 26 extending laterally outwardly through an opening 27 in the block 23. On manipulation of the handle 26 to loosen the nut 25, the block 23 may be adjusted vertically along the ways of the guide 22 and thereafter said handle is manipulated to tighten said nut.

A second T-bolt 28 carried with the block 23 also has its head in the mentioned T-slot and the T-bolt 28 at its outer end is provided with adjustable washer-like nut means 29 threaded to the bolt and overlying recesses 30 in which are located coil springs 31. Said springs bear at their inner ends against the inner ends of the recesses or sockets 30 and at their outer ends against nut 29. Any tendency of the block 23 to tilt in such manner that its upper portion moves outwardly from the guide 22 on loosening of the nut 25 is therefore resisted by the springs 31 and the compression of these springs may be adjusted by threading the nut 29 inwardly or outwardly on the shank of the T-bolt 28.

Connected with a part or strap 32 rigid with the block 23 is one end of a flexible connector 33 shown as a length of sprocket chain. This connector passes over sprockets 34 supported by the upper forward portion of the column 11 and then passes to the interior of said column and therein over a sprocket 35. The inner or lower portion of the connector is connected at 36 with a weight 37 adapted for guided vertical movements on rods 38 located within the column 11. Thus, it will be seen that the weight 37 is a counterbalancing means for the block 23 and the tool head (to be described) mounted on such block.

Mounted within the upper portion of the column 11 by means of a suitable bracket structure generally designated 39 is a variable speed electric motor 40. The shaft 41 of the motor is, through a coupling 42, connected to drive a flexible shaft 43 extending upwardly through the upper end of column 11. Above the column, flexible drive shaft 43 is enclosed in a flexible boot 44 together with hydraulic and pneumatic leads or flexible conduits of which two, designated 45 and 46, are shown in Fig. 1 while others are shown in Fig. 2 and all are shown in schematic Fig. 19.

The boot 44 and the elements therein are carried through a loop or an arc of 180° or thereabouts and the other end of the flexible drive shaft 43 enters an upper housing portion 47 (Fig. 4) comprising part of the tool head generally designated 48. Within the housing 47, the end of flexible drive shaft 43 is connected, through a coupling 49, into driving relation with a vertical shaft 50. Shaft 50 is relatively short and terminates within a housing portion 51 and therein carries a gear 52 meshing with a gear 53 keyed or otherwise made fast with a short tubular shaft 54 mounted in parallel relation with shaft 50. Thus, it will be understood that the flexible shaft 43 drives the shaft 54.

Fixed to the underside of the gear 53 is a clutch element 55 while a complemental or companion clutch element 56 is fixed to the upper end of a stud 57 vertically reciprocable in a socket 58 opening through the upper end portion of a relatively heavy shaft 59. Stud 57 is bifurcated or provided with a longitudinally extending slot 60 straddling a pin 61 carried by the shaft 59. Then a coil spring 62 bears at one end against the shaft 59 and at its other end against the underside of the clutch element 56 and serves to normally yieldingly maintain the element 56 in coupled or driving relation with the clutch element 55 whereby the short shaft 54 serves to drive the shaft 59.

While the spring 62 is constantly urging the clutch element 56 into clutching engagement with the clutch element 55, these elements may be disconnected by downward shifting of the element 56 against the action of the spring 62. Means are provided for that purpose and such means (see Fig. 5) includes a rod 63 extending through the hollow shaft 54 and which rod at its lower end bears against the central portion of the upper side of the clutch element 56. At its upper end, rod 63 is in engagement with a spud or projection 64 extending radially downwardly from a horizontal shaft 65 to one end of which an elbow 66 serves to connect a handle or hand lever 67. Said elbow is fixed to the shaft 65 by a pin 68.

On rocking of the hand lever 67 to a vertical position the spud or projection 64 is moved to a vertical position and is depressing the rod 63 to depress and uncouple clutch element 56. On movement of the handle 67 to either side of the vertical, the stud is carried from over the rod 63 releasing the same whereupon spring 62 moves element 56 into clutching engagement with element 55. A spring pressed ball 69 may seat in a recess to maintain the handle 67 and thus shaft 65 and spud 64 in whatever positions these parts may be manually moved, i. e., a position permitting the clutch element 56 to engage clutch element 55 or to a position maintaining the clutch elements disconnected.

The heavy tubular shaft 59 extends not only through a main yoke portion 70 of the tool head 48 but also through a main yoke portion 71 thereof and is rotatable in each. Shaft 59 has a socket 72 which opens through its lower end and extending into this socket is a bar 73 which toward its upper end is rigid with a pin 74 extending transversely through the bar and through the shaft 59. Actually the pin 74 passes through vertical slots 75 in the opposite walls of the shaft 59 whereby the bar 73 may be adjusted vertically in the socket or opening 72 of the shaft. The bar 73 is normally held in its uppermost position with the ends of its pin 74 against the underside of a horizontal shoulder 76 of an adjustable nut and bearing means generally designated 77.

Such means, in additon to the ring having the shoulder 76, includes a depending externally threaded tubular portion 78 threaded with the inner threaded surface of a fixed tubular part 79. Additionally, means 77 includes an outer shell-like portion or nut 80 overlying the outer surface of the tubular part 79 but comprising a rigid part of the means 77. Through interposed bearings, nut 80 is rotatable on the ring having the shoulder 76. On turning of the nut 80, means 77 is threaded upwardly or downwardly on the tubular part 79 and its shoulder 76 riding against the pin 74 either depresses the pin and thus the bar 73 or permits the pin, together with the bar 73, to rise.

As shown in Fig. 9, the nut 80 is externally knurled or roughened at 81 in order that it may be better gripped for turning and about its lower edge carries graduations 82 to be read in connection with a suitable zero marker 83 (Fig. 2) on the forward side of the outer surface of the tubular part 79. The upper and lower portions of shaft 59 are shown as mounted in suitable bearings 84 and 85, respectively, in the main yoke portions 70 and 71.

At its lower end, bar 73 is connected through a flexible connector 86 with the upper end of a bar 87 having a tapered lower end cam surface 88 entering a socket 89 opening through the lower end of a main spindle member 90. Bar 87 is normally urged to an upper position by a coil spring 91 located about the bar and within a socket 92 opening through the upper end of the main spindle member 90. Thus, this spring acting against the bar 87 and through the coupling 86 on the bar 73, normally maintains the latter in an upper position with the ends of its transverse pin 74 against the shoulder 76 of the means 77.

Figure 17:
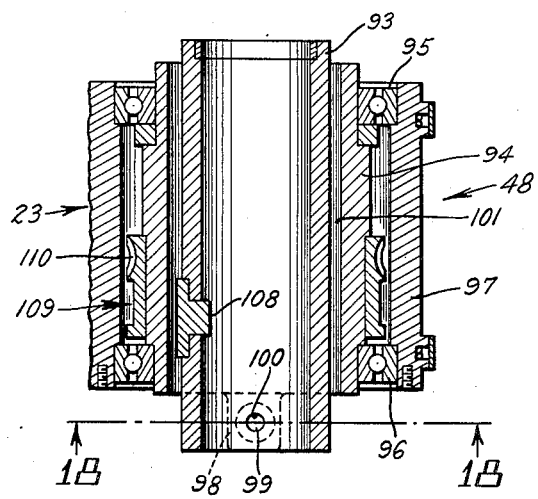
Fig. 17 is a detail sectional view showing the construction and mounting of the sleeve or quill for the main spindle.
Figure 18:
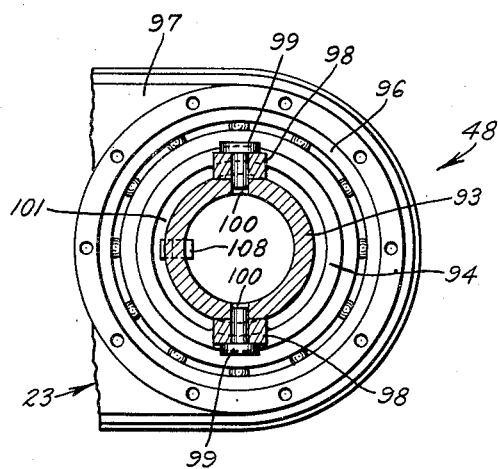
Fig. 18 is a detail sectional view taken as along the line 18—18 of Fig. 17.

Main spindle 90 is vertically movable within and rotatably drives a tube or sleeve 93. Sleeve 93 is located within a cylinder 94 rotatably mounted in upper and lower bearings 95 and 96 supported by a main spindle housing 97 comprising a part of the above described vertically adjustable block 23. Cylinder 94 has a pair of diametrically opposite depending lugs 98 (Figs. 4, 17 and 18) carrying aligned pins 99 received in openings 100 in the lower portion of the sleeve 93. These pins serve to provide a transverse axis or fulcrum point on which the sleeve 93 may pivot, it being noted (particularly with reference to Fig. 4) that there is a circumferential space 101 surrounding the sleeve, or between the sleeve and the cylinder 94.

The coupling 86 includes a thrust link 102 aligned with the bars 73 and 87 and pivotally connected at its respective ends to the adjacent ends of said bars. Then there is the driving link 103 surrounding the link 102 and pivoted at its respective ends to the adjacent ends of extensions 59a and 90a rigid with shaft 59 and hollow spindle 90, respectively. Thus, the coupling 86 may be described as a semi-universal joint to permit of offsetting of the bars 73 and 87 and the shaft 59 and spindle 90 on tilting of the sleeve 93 and thereby the spindle on the axes formed by the pins 99 above mentioned. The purpose of this is to offset or tilt the driving spindle 90 whereby a tool on the lower end of said spindle and later to be described may be reciprocated at an incline for the grinding of tapered holes.

Supported by the cylinder 94 is an element 104 through diametrically opposite parts of the upper portion of which are threaded screws 105 and 106 located normal to the axes represented by the pins 99. These screws abut the upper portion of the sleeve 93 and, in Fig. 4, maintain the sleeve central with respect to the cylinder 94. However, on backing off of the screw 105 and tightening of the screw 106, the sleeve 93, together with the main spindle 90 and all parts carried by the latter, will be located at an incline. From Fig. 4 it will be clear that the limit of inclination of the main spindle is reached when an upper portion of the sleeve 93 engages the inner surface of the element 104 or of the cylinder 94.

The machine includes means for reciprocating spindle 90 and a tool carried thereby, which means are later to be set forth in detail. To permit of such reciprocation, spindle 90 is provided with a longitudinally extending key-way 107 into which enters or projects a key 108 carried by the sleeve 93. Thus, it will be seen that as the spindle is rotated through the coupling 86, the rotary movement of the spindle is imparted through the key-way and key to the sleeve 93. Yet, owing to the employment of the key and key-way, the spindle may move vertically or be reciprocated vertically in the sleeve 93. Then sleeve 93 being connected with the depending portions 98 of the cylinder 94 through the pins 99, rotation of the sleeve is imparted to the cylinder, the latter turning in the upper and lower bearings 95 and 96.

Fixed to the outer surface of the cylinder 94 and encircling the same is a means 109 carrying a worm gear 110. At certain times, as will later be set forth, it is desirable that the spindle 90 be manually oscillated. To that end, a shaft 111 (see Figs. 4 and 12) is mounted by the spindle housing 97 in tangental relation to the worm gear 110. Such shaft at its inner end enters a socket 112 and in its intermediate portion passes through a larger diameter cylindrical opening 113. Fast with the shaft 111 is a worm 114. Then the shaft is provided with inner and outer circumferential grooves 115 and 116 and on its outer end has a hand wheel 117 fixed thereto.

Fig. 12 shows the details of this structure and in that figure the full line positions are the operable positions while the dotted line positions are the inoperable or non-functioning positions of the parts. A key or plunger 118 having a finger piece 119 is normally urged inwardly as by a coil spring 120. When this key is in the groove 115, the shaft 111 is secured in position with its worm 114 meshing with the worm gear 110. Now, on rotation of the shaft 111 through manipulation of the hand wheel 117, the gear 110 and thus the entire spindle assembly within the cylinder 94 will have turning movement imparted thereto. On retraction of the key 118, by drawing outwardly of the hand piece or finger piece 119, the shaft 111 may be shifted inwardly carrying the worm 114 inwardly to the dotted line position where such worm does not mesh with the worm gear 110.

In this position of the parts, the key 118 is located in the annular groove 116 in the shaft so the shaft is secured in this inner position and the worm and worm gear 114 and 110 are kept out of mesh whereby the spindle assembly is free to turn independent of the worm 114 and the shaft 111. In the inner end of the socket 112 is a micro-switch 121 located in the circuit of the variable speed electric motor 40 and breaking such circuit when the shaft 111 and parts thereon are in the full line position of Fig. 12. Thus, when the hand wheel 117 is being used to manually turn the spindle assembly, there is no possibility that the motor 40 may be energized. On shifting of the shaft and hand wheel to the broken line position of Fig. 12, the micro-switch 121 is automatically moved into circuit closing relation insofar as the circuit of motor 40 is concerned and has no function with respect to said motor.

In the machine (see Figs. 1, 2 and 13) a very high speed air motor unit 122 is carried by the lower end of the main rotatable and vertically reciprocable spindle 90. Fixed to the lower end of main spindle 90 is a block 123 having an opening 124 therethrough and a dovetail 125 mounting a dovetail slide 126 to which screws 127 attach a block 128 mounting the high speed air motor 122. A screw 129 is rotatable in the dovetail slide 126 and threads through a short pin or stud 130 (Figs. 13 and 16) turnable about its own axis in a sleeve 131 having slots 132 providing clearance for the screw.

A lever 133 is pivoted intermediate its ends at 134 and its upper end portion 135 engages the cam face 88 of bar 87. Below its pivot lever 133 includes a portion 136 encircling or receiving the sleeve 131. With this arrangement, on rotation of the screw 129 by the application of a tool to its end 137, the stud 130 is fed along the screw and moves with the lever 133 whereby the latter is rocked on the pivot 134 to cause the upper end portion 135 of the lever to bear against the cam face 88 of bar 87 and to shift the dovetail slide 126 in the direction of the length of the screw but to the right or the left (Fig. 13) depending on the direction in which the screw is turned.

When the present machine is in use, air under pressure is supplied to drive the turbine wheel of the air motor unit 122 whereby to drive a chuck 138 at very high speeds (50,000 R. P. M.) and such chuck drives, through a stem 139, a small grinding wheel 140 or other tool as may be in use. The wheel 140 is given a planetary movement. The air motor rotates the wheel on the axis of the stem 139 and the motor 40 rotates the entire air motor unit 122 through a circular motion or on a circular path. The drive of the motor 40 down through the spindle 90 has been described.

To obtain the circular path of movement of the tool 140, adjustment is made to locate the shaft of the tool 140 in eccentric relation to the main spindle 90. A coarse adjustment is obtained by rotation of the screw 129 in the manner above described. Then for the finished fine adjustment, the element 77 is used providing a micrometer adjustment by depressing its shoulder 76 against the transverse pin 74 to shift downwardly the bar 73 and through the link 102 of coupling 86 the bar 87. This forces the cam face 88 of rod 87 against the upper end portion of the lever 133 tending to rock the same slightly and give minute adjustment to the dovetail slide 126. The purpose of the two adjustments will be clear when it is understood that the adjustment which may be accomplished with the element 77 is limited. Thus, a coarse or approximate adjustment is made by rotating the screw 129 while spindle 90 is stationary and then the fine finish adjustment is accomplished through the element 77 with spindle 90 rotating.

In use of the machine, the tool head yoke portions 70 and 71, together with the parts mounted therein, are reciprocated along with the main spindle 90. Portions 70 and 71 are integral parts of a yoke generally designated 141. Thus, it will be understood that the main spindle is rotated by the motor 40 at a relatively low speed, that the main spindle is reciprocated, and that through the air motor 122 the tool 140 is rotated at a high speed. In addition, the tool is carried through a planetary motion by the slow rotation of the main spindle 90. The means for rotating the main spindle 90 and for adjusting the eccentricity of the tool spindle with relation to this main spindle has been described. Now will be described the means for imparting the reciprocating motion to the reciprocable portions or parts of the tool head.

The yoke 141 (see Figs. 4 and 8) includes a body portion 142 having three cylinders 143, 144 and 145 formed therein. These cylinders are lined with steel tubings 146 and at their upper ends are closed by a head 147 and at their lower ends by a head 148. In the actual construction, the body portion 142 is a portion of the yoke which is integral with the bearing portions 70 and 71 and the heads 147 and 148 are secured in position by bolts or otherwise as desired.

The cylinders 143 and 144 are air cylinders while the cylinder 145 is a liquid or oil cylinder, as will more fully appear. Located in the air cylinders 143 and 144 are pistons 149 and 150, respectively. These pistons are fast with rods 151 and 152, which rods at their lower ends are fast with the block 23, being threaded or otherwise connected with the block. Within the liquid or oil cylinder 145 is a piston 153 rigid with a piston rod comprising a lower portion 154 extending downwardly from the piston and an upper portion 155 extending upwardly therefrom. Thus, the piston rod extends from opposite sides of the piston 153 and, in fact, rod portion 155 extends entirely through the upper cylinder head 147. At its lower end, piston rod portion 154 extends through the cylinder head 148 and is threaded to or otherwise made rigid with the block 23.

Packings 156 encircle the piston rods 151 and 152 within the lower cylinder head 148. Somewhat similarly, inner packings 157 and 158 encircle the piston rods 155 and 154 where they pass through the cylinder heads 147 and 148, respectively. In such cylinder heads, outwardly of the packings 157 and 158, are annular chambers or cavities 159 and 160 encircling piston rods 155 and 154, respectively, and providing liquid seals about such rods as will appear. Then, outwardly of the mentioned annular chambers or cavities, other seals 161 and 162 encircle the piston rods 155 and 154, respectively, to guard against leakage outwardly from the cavities 159 and 160, respectively.

Figures 19, 20:
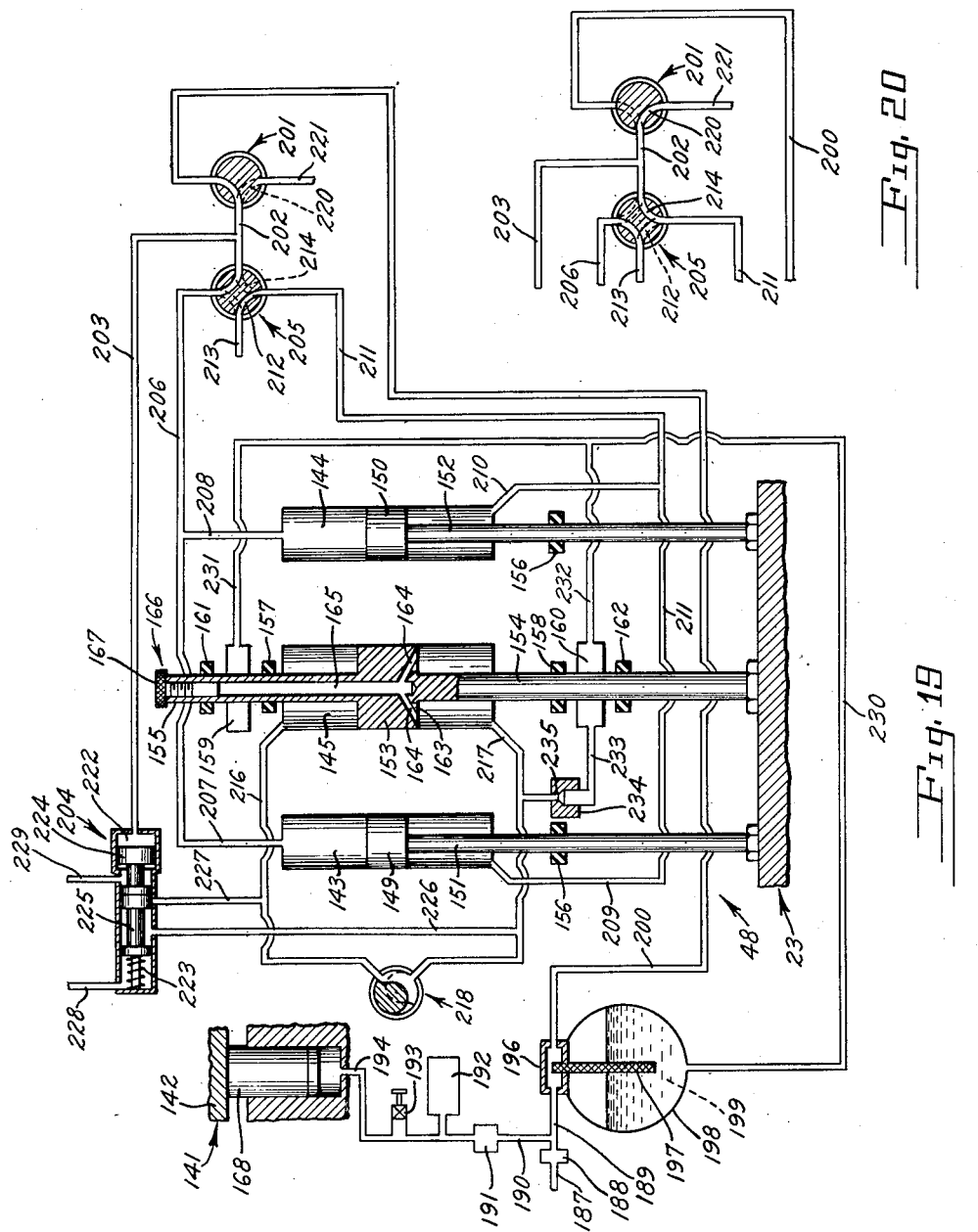
Fig. 19 is a schematic view showing the pneumatic and hydraulic systems.
Fig. 20 is a detail view showing a pair of valves of Fig. 19 in reverse positions.

As will presently appear when considering the schematic drawing of Fig. 19, the cylinder 145 is part of a closed hydraulic system or circuit. The tool head 48 is reciprocated by the supply and exhaust of compressed air to and from the cylinders 143 and 144 alternately at opposite sides of the pistons 149 and 150. It is necessary that the tool 140 be reciprocated with a smooth even stroke. Compressed air alone may not be used for this purpose and thus the mentioned closed hydraulic system is employed to limit the speed of reciprocation by the compressed air. It is necessary that this hydraulic system be kept full and free of any air or air bubbles and means are provided for removing any entrained air from the hydraulic circuit.

To the desired end, the piston 153 is hollowed out or slightly conical on its underside about the piston rod 154 as at 163. This conical depression may be annular and through ports 164 communicates with an opening or a longitudinally extending passage 165 in the piston rod or piston rod portion 155. With this construction, air trapped below the piston 153 tending to move upwardly moves through the ports 164 into the passage 165. At its upper end, this passage is closed as by a means 166 having a knurled finger gripping portion 167. At various times and particularly when the machine is initially placed in operation, the means 166 is opened slightly to permit the exhaust of air from the passage 165. Preferably, this means is of a type having a very small orifice therethrough and such that on easing of the screw, air may bleed through this orifice and then as soon as oil appears in a solid form, the screw is tightened back into place. It may be necessary to thus bleed air from the hydraulic system osccasionally during use of the machine.

The body 142 of yoke 141 carries a pair of guide bars 168 and 169. Sockets 170 are formed in the yoke body 142 and open through the lower side of the latter and then into these sockets are inserted the upper ends of the guide bars 168. One guide bar may seat against the closed upper end of its socket 170. However, these guide bars carry rack teeth as will later appear and so it is necessary that the guide bars be accurately positioned relatively in order that their rack teeth be aligned to properly mesh with the teeth of gears or pinions mounted on a common shaft. Therefore, means are provided whereby one bar may be slightly adjusted longitudinally for the alignment of the mentioned rack teeth.

To the desired end (see Fig. 9) a screw 171 is threaded through the top wall of yoke body 142 into the upper end of the guide bar 168. Then a pair of screws 172 are threaded through the mentioned portion of the yoke to bear against the upper end of said guide bar 168. Thus, by easing on the screws 172 and tightening on the screw 171 or vice-versa, the guide bar 168 may be adjusted slightly upwardly or downwardly.

The guide bars 168 and 169 enter the block 23 through elongated or tubular bushing members 173 anchored in place at their lower ends by nuts or caps 174 which serve to draw enlarged diameter portions 175 of said cylindrical or tubular bushings against the upper side of the block 23. It is within these bushings 173 (Fig. 10) that the guide bars are provided with rack teeth, those of the guide bar 168 being designated 176 and those of the guide bar 169 being designated 177.

Extending through the block 23 is a shaft 178 mounting gears or pinions 179 and 180 constantly meshing with the rack teeth 176 and 177, respectively. About the shaft, toward one end, is a collar or collar-like member 181 in which the shaft is turnable and which may, in fact, be an integral part of the block 23 since it is stationary with the block. Then, about the shaft is a bearing or bushing 182 on which is located a collar 183 having graduations about its outer periphery to be read in conjunction with a zero mark or the like on the collar 181. The graduation carrying collar 183 may turn on the bushing 182 but is frictionally held against such movement. Thus, a ring 184 is keyed to the bushing 182 and a biasing spring washer 185 is located between said ring and the collar 183 whereby except that the collar is held while the ring is turned, the parts turn together.

In the actual construction, the ring 184 is the hub of a hand wheel 186 which will be used for turning or oscillating the shaft 178 to raise and lower the guide rods 168 and 169 and thus the yoke 141 and the tool head portions movable vertically therewith. It is noted that in the construction shown the gears or pinions 179 and 180 are always in mesh with the rack teeth 176 and 177, respectively, and thus on any reciprocation of the tool head, as the guide rods 168 and 169 are reciprocated, the shaft 178 will be oscillated.

Assuming the machine to be in use and in automatic operation through its cycle, under such circumstances the tool 140 will have a planetary motion, being rotated at extremely high speed about its own axis and at a lower speed through a circular path, power for such movement of the tool through such circular path being furnished by the motor 40 operating through a flexible shaft 43.

In addition, the machine being on auto-cycle, the movable parts of the tool head are being reciprocated vertically with respect to the mounting block 23. Such reciprocation is accomplished by the hydraulic pneumatic means above described and shown best in Fig. 8. The operation of such means will probably be best understood through reference to schematic Figs. 19, 20 and 21 and particularly Fig. 19. In that figure, air from a compressor (not shown) moves through the pipe or line 187 and through a regulator valve 188 to a pipe 189. A branch 190 has a one-way check valve 191 therein and said branch serves to supply compressed air to an accumulator 192 and through or past a bleed valve 193 to a connection 194 with the lower end of the cylinder formed about the lower end of guide rod 168 by the cylindrical bushing 173 thereabout. In this connection, with reference to Fig. 9, it will be seen that a packing 195 is provided on the lower end of the guide rod 168.

From a fitting 196 in the line 189, a porous wick-like means 197 enters a reservoir 198 containing a hydraulic fluid 199, preferably oil. The wick 197 through capillary action raises oil from the reservoir 198 and the air passing through the fitting 196 from the line 189 to a line 200 entrains some of this oil and carries it into the cylinders 143 and 144 for lubrication of these parts. Line 200, through a two-way control valve 201, supplies compressed air to a line 202 which, in turn, through a line 203 supplies compressed air to a by-pass valve 204. Also, the line 202 supplies this compressed air to a four-way reversing valve 205 which in one position, i. e., the position of Figs. 19 and 21, supplies compressed air to a line 206 and through laterals 207 and 208 from the latter to the upper ends of the cylinders 143 and 144.

At this time, air from the lower ends of said cylinders is exhausted through branches 209 and 210 to a line 211 and thence through the passage 212 of the four-way valve to an exhaust line 213. The air being admitted into the upper ends of the cylinders 143 and 144 cannot move the pistons 149 and 150 downwardly, said pistons being immovable relative to mounting block 23, and therefore the yoke structure 141 containing the mentioned cylinders must raise upwardly whereby the tool head 48 is moved upwardly.

At the limit of upward stroke of the tool head a circuit is closed, by a micro-switch later to be described, to a solenoid 305 (see Fig. 21) controlling the four-way valve 205 whereby the latter is reversed as from the position of Fig. 19 to the position of Fig. 20. Now, the line 206, which formerly was supplying compressed air to the upper ends of the cylinders 143 and 144, is connected with the exhaust line 213.

Also, now the supply line 202 is connected through the valve passage 214 to pipe 211 for supplying compressed air to the branches 209 and 210 and thence to the lower ends of the cylinders 143 and 144. Now the pistons being immovable, the cylinders and, in fact, the yoke structure 141 is forced downwardly shifting the tool head 48 downwardly. From this it will be seen that as the valve 205 is alternately reversed by the mentioned solenoid, air is alternately furnished to the upper and lower ends of the cylinders 143 and 144 and the tool 140 and tool head 48 are reciprocated vertically.

The length of the reciprocating stroke is limited by the cylinder lengths employed and the reciprocation is a working stroke. The tool head is positioned on the column 11 therefore depending upon the position of the work to be ground. If it is a thin piece of work or a tall piece of work, it will project more or less above the table 15. Therefore, to take care of different sizes of work, the clamping nut 25 is released and the block 23 adjusted downwardly or upwardly on the ways in the guide 22. This is accomplished by manual rotation of a spider 219 fast on the outer end of a shaft 215 carrying the sprocket 35 above referred to.

With the clamping nut 25 loosened, clearly, on turning of the spider, the sprocket chain 33 will be moved in one direction or the other to raise or lower the block 23 and thus the entire tool head. During any such adjustment, when the clamping nut 25 has been released, the coil springs 31 in association with the T-bolt 28 prevent overbalancing or tilting of the tool head 48.

As above mentioned, reciprocation of the tool head by the use of compressed air is likely to give too rapid movement during free motion of the tool head and uncertain movement when a load is encountered as the tool engages work. The hydraulic means or circuit of the invention provides a resistance to the mentioned reciprocating movements of the tool head and serves to give a steady, smooth stroke to the latter in either direction.

Such hydraulic means, in addition to the cylinder 145, includes pipes 216 and 217 connected with the upper and lower ends, respectively, of the said cylinder and themselves connected through an adjustable metering valve 218. Clearly, as the air moves the yoke body 142 upwardly and downwardly, the liquid must pass from one end of the cylinder 145 through the metering valve 218 to the other end of said cylinder. Depending on the extent to which this metering valve is opened, the rate of movement of the yoke 141 and of the whole tool head is controlled.

Here it is noted that the location of the air cylinders 143 and 144 at opposite sides of the hydraulic cylinder 145 and the location of all of these cylinders within the block 142 is advantageous in that the arrangement provides for the maintenance of a uniform temperature in the liquid of the hydraulic system. When the machine is in use, the hydraulic liquid becomes heated due to the friction of its passage through the system. However, as compressed air is supplied to the air cylinders 143 and 144, the air expands and cools the cylinders and adjacent portions of the body or block 142 as well as the heads 147 and 148 on the block or body. Thus, the block or body and the heads may, in turn, take up heat from the hydraulic cylinder 145 and the liquid therein.

At certain times, as will hereinafter appear, it is desirable to manually move the tool head and at such times the auto-cycle portion of the machines operation is discontinued and the control valve 201 shifted to the position of Fig. 20 with the reversing valve 205 also in the position shown in that figure. This not only exhausts air from the upper ends of the cylinders 143 and 144 as above explained but also exhausts air from the lower ends of the cylinders since the line 211 through the passage 214 of valve 205 and the line 202 through a passage 220 of the valve 201 communicates with an exhaust line 221. Thus, both ends of each cylinder are opened to exhaust.

Additionally, with the control valve 201 positioned as in Fig. 20, the line 203 is opened to exhaust since it is but a branch of the line 202. The air being exhausted from the line 203, the cylinder 222 of the by-pass valve 204 is exhausted and a coil spring 223 may push a piston 224 and a spool valve 225 toward the right as viewed in Fig. 19, placing a line 226 in communication with a line 227. These lines 226 and 227 together with the passage through the by-pass valve 204 provide a by-pass for the metering valve 218. Under these conditions, the liquid may flow freely from one end to the other of the cylinder 145 and the operator may easily manually raise and lower the tool head without any resistance to movement of the liquid such as would be encountered if the liquid had to pass through the metering valve 218. Thus, the metering valve is by-passed and the tool head may be manually reciprocated by back and forth turning of the hand wheel 186 and any setting of the metering valve will not be disturbed.

At 228 and 229 are shown openings or exhausts whereby air within the by-pass valve 204 will not interfere with its prompt operation under the urging of the spring 223 or on the supply of compressed air to its cylindrical end portion 222.

The air supplied to the underside of the guide bar 168 through the connection 194 is at the line pressure used for operating other pneumatic parts of the machine and is that establishd by adjustment of the regulator valve 188. The air so supplied to the underside of the guide rod 168 is for counterbalancing purposes and the area available at the lower end of said rod is such with respect to the pressure of the air used as to take up the entire weight or substantially the entire weight of the tool head 48 comprising all reciprocable parts. This counterbalancing of weight is especially desirable when the tool head is to be manually raised or lowered by manipulation of the hand wheel 186 under conditions which will appear. At such times, the by-pass valve 204 is in such position that the liquid may move from one end to the other of cylinder 145, by-passing the metering valve 218.

It is desired that the compressed air under the guide bar 168 be present at all times and when air is exhausted from the cylinders 143 and 144 and from the by-pass valve 204, the air at the underside of rod 168 remains trapped owing to the presence of the one-way valve 191. To compensate for any loss of air about the guide rod 168, the accumulator 192 is provided whereby the machine may be left overnight with the tool head in any position and air will not leak out and permit the tool head to drop.

When part of the tool head is being changed to provide for different operations, heavier or lighter means may be substituted. At this time, when a tool is substituted, the regulator valve 188 is adjusted in accordance with the weight of the substituted parts. However, if the substituted parts are lighter, the one-way valve 191 maintains the former high pressure locked in the accumulator and at the underside of the guide rod 168. Now, the operator having adjusted the regulator valve 188 for the lesser pressure, he opens the bleed valve 193 temporarily to bleed the excessive pressure. In fact, the bleeding operation may be excessive and when the bleed valve is released and closed, the pressure in the accumulator and under the guide rod 168 will be brought up to that pressure determined by the adjustment of the regulator valve 188.

It is particularly desirable that the hydraulic system be completely full of liquid at all times and that no air be admitted to the system since any air bubbles moving through the metering valve 218 would result in irregular and uncertain vertical movement of the tool head. Any oil being lost out of the cylinder 145 along the piston rods 154 and 155 will be entrapped in the encircling liquid sealing chambers 160 and 159, respectively. Also, these chambers provide liquid seals about the mentioned piston rods preventing movement of air inwardly along the rods into the cylinder 145.

The chambers or oil seals 159 and 160 are kept constantly filled with oil under pressure. The oil supplied to these chambers is the same as that used in the hydraulic system. Such oil is that shown at 199 in the reservoir 198. This oil is under a head of air in the upper portion of the reservoir, such air being admitted to the reservoir from the fitting 196 through the wicking 197. From the reservoir, a line or pipe 230 carries the oil to branches 231 and 232 leading to the chambers 159 and 160. Thus, the oil in these chambers is under pressure and is actually under approximately the identical pressure with the oil in the above described closed hydraulic system.

One of the sealing chambers as, for example, the chamber 160, is connected in the above mentioned closed hydraulic circuit. Thus, from chamber 160 there is a supply line 233 to a member 234 having a very fine orifice 235 therein connected into the line 217 of the closed system. In Fig. 19, the orifice 235 is greatly exaggerated in size. Actually it is about 13½ thousandths of an inch in diameter. It is so small that there is no danger of the loss of oil from the closed system out through the orifice and then again it will be clear that the pressure in the chamber 160 and thus in the orifice from the chamber is equal to the pressure in the closed hydraulic system. However, should there be any loss of liquid from the closed hydraulic system, it will be made up from the disclosed compensating fluid sealing means through the orifice 235 into the line 217. Then, again, through this orifice 235 compensation is obtained for changes in the volume of the oil in the closed hydraulic system due to expansion and contraction as such oil may be hot or cool. Again, any loss due to the bleeding of air which may have been entrained in the hydraulic system will be compensated for by the admission of oil to the system from the orifice 235.

Any other loss in the volume of oil in the closed system will be compensated for through this orifice and as above suggested, if the volume in the system increases because of expansion due to heat, the excess will pass downwardly through the orifice because of the excessive pressure within the closed system. In like manner, should there be a loss of volume in the system due to cooling of the oil, there will be a drop of pressure in the closed hydraulic system and the pressure in the chamber 160 will cause oil to be forced through the orifice into the line 217 of the closed hydraulic system.

As above suggested, switches are provided for controlling the solenoid for reversing the valve 205 at the limits of the up and down movements of the tool head. Such means includes a pair of micrometer switches 236 and 237 (Figs. 7 and 21) located at the side of the machine. These switches are operated by pins 238 on vertically adjustable rods 239 and 240 carried with the reciprocable tool head. The switches 236 and 237 are mounted on a stationary portion of the machine as on the spindle housing 97. Rods 239 and 240 carry rack teeth 241 and 242, respectively, and such rack teeth mesh with pinions 243 and 244 rotatable by hand pieces 245 and 246, respectively.

Assuming that switch 236 controls the limit of upward movement of the tool head and brings about operation of the solenoid 343 to reverse the valve 205 at the limit of such upward movement, the rod 239 is adjusted to operate the micro-switch 236 at the proper time and such adjustment is obtained by manual manipulation of the hand piece 245. Similarly, rod 240 is adjusted by manual manipulation of the hand piece 246 so as to have the pin 238 trip the micro-switch 237 at the desired limit of the downward stroke of the tool head under the action of the compressed air.

In setting up the machine, the valves 201 and 205 are positioned as in Fig. 20 and the operator manually manipulates the hand wheel 186 until the tool is at one limit of its movement and then he adjusts one of his rods 239 and 240. Then he manipulates the hand wheel and at the other limit of movement of the tool, sets the other rod. In making these settings of the rods with the tool head and tool at the desired limit of movement, the micro-switch will be clicked and the operator knows that the parts are positioned for proper manipulation of the micro-switches and reversal of the four-way valve 205 at the proper times. Thus, by adjusting the rods 239 and 240, the length of the reciprocating strokes and the points of their terminations are determined.

In using the machine, should the operator desire to gauge a hole that is being ground or to gauge other work, he may without disturbing his adjustments of the rods 239 and 240, cause the tool head to move upwardly to draw a tool out of and to a position above the work. He may also have the tool pass downwardly below the lower limit for which the rods 239 and 240 are set without disturbing their adjustment.

A pair of switches 247 and 248 are mounted on the main spindle housing 97 and between them extends a pivoted handle or lever 249 normally maintained centered by springs 250. To run the tool head up above a position for which the rods 239 and 240 are set, the operator shifts the lever 249 to close the circuit of one of the switches 247 or 248. This overrides the effect of the micro-switches 236 or 237, as will be fully described when referring specifically to Fig. 21, and as long as the operator holds the lever 249 tipped, the tool head will continue to move in one direction or the other to the extreme limit of its movement.

This, for example, will draw the tool up out of a piece of work so the operator may use gauges on the work. Instantly the operator releases the lever 249 it is centered by the springs 250 and the switches 236 and 237 resume control. However, if the tool head is moved beyond the range provided for by the switches 236 and 237 to place the machine back in its previous cycle, the operator manipulates the lever 249 in the opposite direction again operating one of the switches 247 or 248 to override the switches 236 and 237 and bring the tool head back into the zone of travel where it comes under the control of the limit and reversing switches 236 and 237.

At times it is desired to grind or otherwise work upon an arcuate surface of less than 360°. In such instance, the high speed air motor may not be revolved on a circular path by power supplied by the electric motor 40. When such work is to be performed, the lever 67 may be operated to disconnect the clutch element 56 from the clutch element 55 and also, if desired, the circuit of motor 40 may be opened. Now, the operator draws outwardly on the finger piece 119 to remove the key 118 from the groove 116 and then draws outwardly on the hand wheel 117 bringing it to the full line position of Fig. 12 and meshing the worm 114 with the worm wheel 110.

As the shaft 111 is drawn outwardly, the micro-switch 121 operates to open the circuit of motor 40 so that said circuit cannot be inadvertently closed and cause damage such as might occur if at such time the clutch elements 55 and 56 were not disengaged. The operator may now turn the hand wheel 117 first in one direction and then in the opposite direction to oscillate the main spindle 90 and the air motor being in eccentric relation with such spindle, the tool 140 will be carried back and forth over an arc.

Stop means are provided where if considerable work is to be done along a given arc the stop means may be positioned and then the operator simply turns the wheel 117 in one direction until one stop is encountered and then reverses his movement of the hand wheel until the other stop is encountered and such action carries the tool 140 over the desired arc. To the desired end, a ring 251 is made fast with the cylinder 94 so as to turn therewith and such ring has a T-slot 252 opening through its upper side.

Nuts 253 may be loaded into said slot through an opening 254 from the underside of the slot and then screws 255 pass through studs or buttons 256 and are threaded into the nuts 253. The T-slot 252 extends through 360° opening through the upper side of the ring 251 and thus it will be seen that the nuts, screws and studs are adjustable entirely about the ring with the studs located on the upper side thereof.

Above an inner portion of the ring 251 is a ring or member 257 fast with the stationary spindle housing 97 as through screws 258. Thus, member 257 is stationary. Said member at spaced points has hardened elements 259 fastened thereto as by screws 260 and into such elements are threaded horizontally disposed pins 261. If a single arc is to be ground, two of the stop pins 261 may be mounted and then two of the stops 256 properly located to engage said pins at each end of an oscillating movement of the main spindle 90 and the tool. In this connection, it will be understood that the ring 251 must turn with the main spindle.

With the mounting of the four pins 261 possible, any desired four of the stops 256 may be employed to provide setups for a pair of arcs on the same radius and on the same piece of work. When the machine is being power driven or rotated, stop pins 261 are removed since otherwise they would hit the stops 256. Also, at that time, the rotating ring 251 is covered by a housing 262 shown in broken lines in Fig. 13 and supported as by screws 263 from a pair of spaced brackets 264.

About its outer surface the ring 251 is graduated as best shown in Fig. 15 and fixed to the lesser diameter ring or element 257 is a block 265 having thereon a zero mark and other graduations. The graduated or indicia bearing surface of the block 265 is flush with the outer surface of the ring 251 and the respective graduations may be read against one another in setting up the stops 256. The cutouts 266 in Fig. 14 are to accommodate the depending portions or extensions 98 carrying the pivoting pins 99 above referred to for the mounting of the main spindle for adjustment to an inclined or tilted position. The openings 267 provide access for the removal or application of the pins 99.

The radial adjustment mechanism, including the dovetail slide 166, is enclosed in an expansible and collapsible boot 268 anchored at its lower end as at 269 to the motor unit 122 and at its upper end as at 270 to a rigid housing structure 271 about the lower end of the spindle 90. Such housing structure, is, of course, rotatable with the spindle as is the boot 268. In this housing structure is a slot 272 whereby access may be had to the adjusting head 137 of the screw 129 when the air motor 122 and parts associated therewith are in an upper position.

Hinged sections or doors 273 enclose the semi-universal coupling 86 and adjacent parts including the screws 105 and 106 for tilting the main spindle, such doors being hinged at 274 for ready opening and at their meeting edges 275 being equipped with any suitable latch mechanism (not shown) retaining them in closed relation. Somewhat similar doors 273a are located below doors 273 and doors 273 may telescope with or move upwardly and downwardly over doors 273a, the latter being stationary with mounting block 23. In the housing 97 are a pair of heating elements 276 and 277 shown as associated with the bearings 95 and 96 and covered by straps 278. These are the heating elements shown in my Patent No. 2,515,146 issued July 11, 1950 and need not be further considered here. At 279 is shown a thermometer indicating the temperature in the bearings of the spindle housing structure 97.

Mounted on the column 11 below the guides 22 is a micrometer adjustment and stop 280. Such stop includes a rounded upper end portion 281 which will provide an absolute bottom limit for downward adjustment of the block 23 carrying the tool head. Additionally, this rounded end 281 is shaped for engagement with the lower ends of size bars of various lengths whereby rapid vertical adjustments of the block 23 and the tool head may be effected to micrometer accuracy without the necessity for repeated measurings.

On the shaft 178 employed in manually vertically moving the tool head is a means comprising part of a positive stop mechanism generally designated 282 and shown more particularly in Figs. 10 and 11. This means comprises a disc-like member 283 slit through one edge as at 284 and adapted to be clamped on the outer end of the shaft 178 but having the edges of its slit 284 drawn toward one another on tightening of a screw 285. On the outer face of this member or disc 283 is a generally spiral groove 286 in which is located one end of a pin 287 carried by an arm 288 fast with a stud 289 rotatably mounted by a means 290.

Threaded through the stud 289 is a micrometer screw 291 having a knurled head 292 for manual turning. Thus, the screw 291 and the arm 288 are both turnable with the stud 289 and relative to the bracket or mounting element 290. Such element preferably includes a cylindrical bearing portion 293 in which the stud is turnable and which is slotted to permit of oscillation of the screw 291 with the stud and the arm 288. Rigid with the disc 283 is a block or projection 294.

It will be understood that when the screw 285 is tightened clamping the disc 283 on the outer end of the shaft 287 that said disc will be turned or oscillated or rotated with the shaft. Such shaft and the hand wheel 186 are constantly turned or oscillated as the tool head 48 is reciprocated in the normal use of the machine. As disc 283 turns with the shaft, the pin 287 being in the groove 286, the arm 288 and the screw 291 will be rocked on or with the stud 289 as the pin 287 is moved inwardly toward the center of the disc or outwardly toward the outer periphery thereof.

At various times, the shaft 178 will be turned through more than a complete revolution depending upon the stroke being imparted to the tool head and therefore the groove 186 includes a relatively long and substantially straight drop-off or portion 295 which serves to rock the arm 289 outwardly so as to carry the screw 291 outwardly to permit of the lug 294 passing under the screw.

When the rods 239 and 240 are set to operate the microswitches there might be a slight overrun due to a lag in the operation of a switch or the like with the result that a tool might be carried against a shoulder of a work piece mutilating the same. The stop means 282 is to prevent any such action. When the tool head is manually moved down to bring the tool against a shoulder (for example) the disc 283 is adjusted to bring its lug 294 against the end of the screw 291 and then the screw 285 is tightened to clamp the disc on the outer end of the shaft 178. Now, as the tool head is carried upwardly, the disc will rotate in a counterclockwise direction as viewed in Fig. 11 and the groove 276 will bring about rocking of the arm 288 and of the screw so as to permit of the lug 294 passing under the screw if more than a complete revolution of the shaft is entailed in the required vertical movement.

Now, the disc 283 having been properly set on the down stroke of the tool head to the limit of the desired movement, the lug 294 on the disc 283 will strike the end of the screw 291 and there is a positive stop preventing further downward movement of the tool head. It will be understood that the disc 283 is set as close as possible to correct position before the screw 285 is tightened. Thereafter, micrometer adjustments to the exact position are obtained by turning of the micrometer screw 291 to have it firmly abut the lug 294 with the tool at the exact end of the desired stroke.

Figures 4, 5:
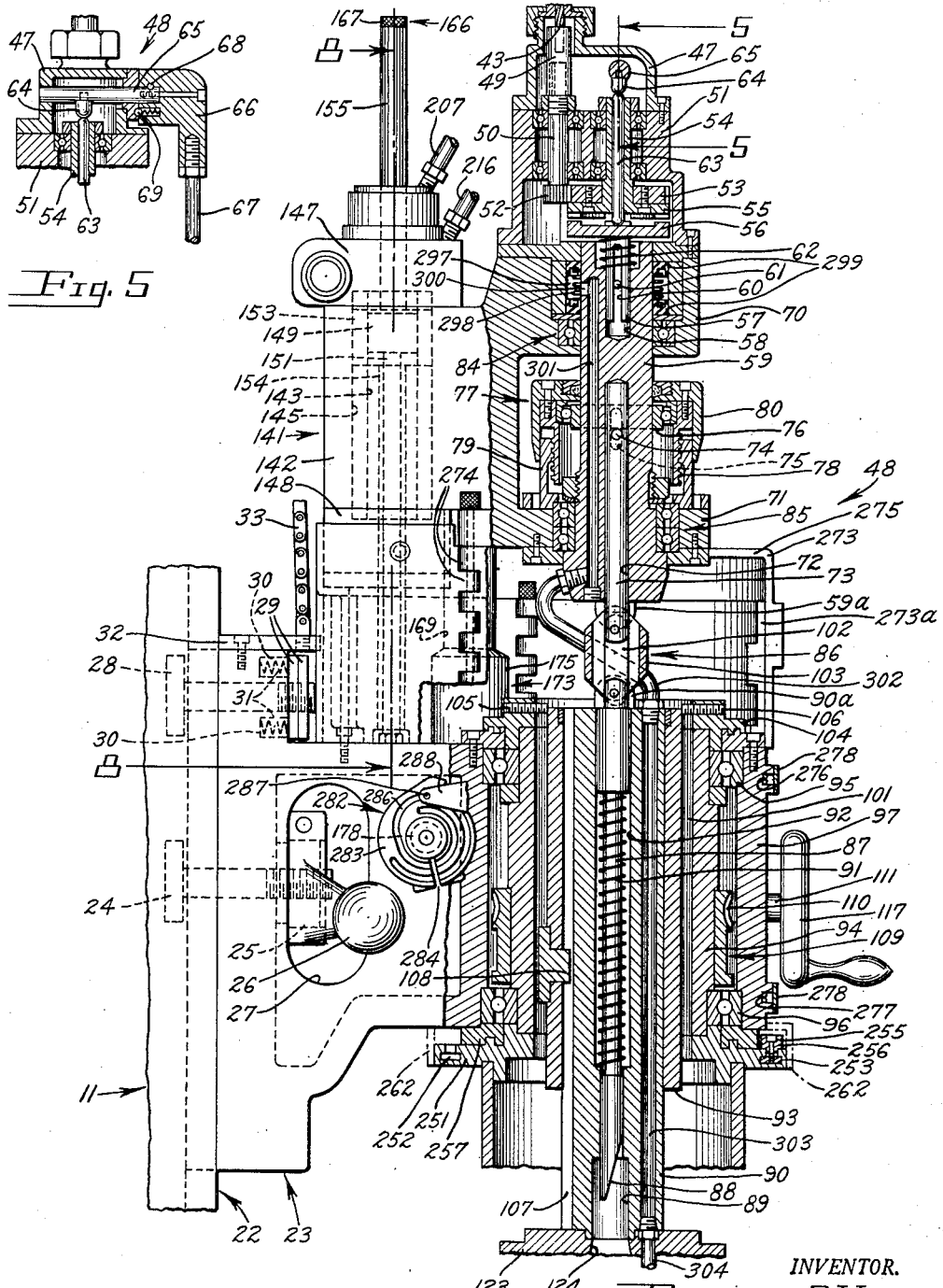
Fig. 4 is a view partly in elevation and partly in vertical central section through the tool head of the machine.
Fig. 5 is a detail sectional view at right angles to Fig. 4 and taken as along the line 5—5 of Fig. 4.

Compressed air for operation of the air motor unit is supplied through a flexible connection 296 (Fig. 2) into a chamber 297 (Fig. 4). Extending through this chamber is the rotatable shaft 59 and a coil spring 298 about said shaft maintains seals 299 in positions sealing the ends of the chamber about the shaft. Compressed air from the chamber 297 enters shaft 59 through a radial opening 300 in the latter and then moves downwardly longitudinally of the shaft through passage 301.

From the lower end of this passage a flexible coupling or tube 302 conducts the compressed air to the upper end of a longitudinally extending passage 303 in the main spindle 99. A flexible tube or conduit 304 serves to conduct the discharge from passage 303 to the air motor unit 122. The flexible conduit 304 is necessary to permit of the eccentric adjustment of the unit 122 with the dovetail slide 126 whereby to provide for the movement in the desired circular path, depending on the diameter of the hole being ground with tool 140.

Referring now specifically to the schematic illustration, Fig. 21, the parts shown and heretofore described are identified by the part numbers heretofore used. At 306 is shown one wire of an incoming power supply, the other wire 307 thereof being conveniently shown as grounded at 308. A switch 309 is shown as closed completing a circuit from wire 306 to each of a pair of wires 310 and 311. A switch 312 is connecting the wire 311 with a wire 313 and the latter leads to the coil 314 of a solenoid 315, such coil being grounded at 316. Core 317 of solenoid 315 is at one end pivoted at 318 to the outer end of a lever 319 fixed to the shiftable part 320 of the control valve 201, such valve part having the passage 220 therein.

A coil spring 321 has one end anchored at 322 and has its other end connected with the lever 319. When the switch 312 is in the position shown (Fig. 21) solenoid 315 is energized and the valve passage 220 is placing the intake or compressed air supply line 200 in communication with the pipe 202. At such time the machine is operating automatically through its normal cycle or is on "auto cycle." However, when switch 312 is opened the solenoid 315 is de-energized and the coil spring 321 takes over and shifts the valve part 320 whereby the passage 220 places the line 202 in communication with exhaust pipe 221 and the air circuit of the machine is bled and the machine may be operated by hand as previously described. However, it will be understood that normally switch 212 is in the position shown.

Wire 310 connects with the movable contact 323 of switch 247 including additional contacts 324 and 325, the latter being normally in closed circuit relation with the contact 323. A branch 326 from the wire 310 connects with the movable contact 327 of the switch 248 and the latter additionally includes contact 328 and a contact 329 normally engaged by the contact 327. From the contact 325, a wire 330 leads to the movable contact 331 of switch 236, such movable contact being normally in open circuit relation with a second contact 332 of said switch. Then, from the contact 329 of switch 248, a wire 333 connects with a movable contact 334 of the switch 237 and said movable contact is normally in open circuit relation to a contact 335 of said switch 237. A wire 336 is connected with a lead 337 from the contact 332 and said wire 336 serves to connect contact 332 with the coil 338 of the solenoid 305, of which the core 339 has a pivotal connection at 340 with the outer end of a lever 341. Such core is, of course, shiftable on energizing of the coil 338 and it is shiftable in the opposite direction on energizing of the coil 342 of a second solenoid 343, the core 339 being common to the coils 338 and 342. Additionally, there is a connection 344 between these coils and such connection is conveniently grounded at 345.

Lever 341 is fixed to the movable part 346 of the four-way reversing valve 205 and it is such movable part of the valve that contains the passages 212 and 214. From the contact 335 of switch 237, a wire 347 leads to the coil 342 of solenoid 343.

It is also noted that the wire 337 above referred to as connected with contact 332 of switch 336 is connected with the contact 328 of the switch 248.

In operation of the machine, the lever 249 is normally in the position shown, being balanced in such position by the springs 250. With the parts positioned as in Fig. 21 and the valves in the full line position of that figure, the tool head of the machine is moving upwardly, air under pressure at this time being admitted to the upper portions of the air cylinders. Now there is no circuit to either the solenoids 305 or 343. However, very shortly the pin 238 on the rod 239 will engage an actuator 348 to shift contact 331 of switch 236 to have such contact engage its companion contact 332.

When this happens, a circuit is completed to the solenoid 305 and such circuit is as follows: wire 310 to contact 323 to contact 325 through wire 330 to contact 331, through the latter to contact 332 and thus to wire 336 connected with the coil of the solenoid 305. Instantly this happens, the valve part 346 is rocked from the full to the dotted line position of Fig. 21, shifting the supply of compressed air available in pipe 202 from pipe 206 to pipe 211 and connecting pipe 206 with the exhaust 213. This supplies air to the lower ends of the cylinders and exhausts air from the upper ends of the cylinders whereby the cylinders are pushed downwardly, pistons 149 and 150 being immovable, and the tool head is started downwardly. As the tool head starts downwardly, the rods 239 and 240 are moved downwardly, the pin 238 of the former releasing the actuator 348 so that contact 331 moves away from contact 332 again opening the circuit of the coil 338 of solenoid 305. However, the pressure of the air moving through the valve retains it in place.

As the tool head moves downwardly in the normal course of events, pin 238 of rod 240 engages the actuator 349 of switch 237 and pushes the contact 334 of said switch into engagement with contact 335 thereof. Now a circuit is closed to the coil 342 of solenoid 343 and the valve part 346 again reversed bringing it back to its full line position and now air is exhausted from the undersides of the pistons 149 and 150 and supplied to their upper sides so that the tool head again starts upwardly. As pin 238 of rod 240 leaves actuator 349, the circuit through switch 237 is broken, de-energizing the coil 343 of solenoid 342, but the pressure of the compressed air moving through the valve retains it in the position to which it has been shifted. From the foregoing, it will be seen that the positioning of the rods 239 and 240 controls the limits of the reciprocating movements of the tool head.

At times it may be desired to withdraw the tool from a piece of work for inspecting or gaging, or the like, and at such times it will be desired to have the tool move up clear of the work, the movement being greater than would be desired during the normal operation. At other times, it may be desired to have the tool move downwardly entirely through the work and yet at other times, the operator may have reasons to want to instantly reverse the direction of movement of the tool head. Any of said objectives are obtained by manual manipulation of the lever 249.

Assuming the tool head to be moving upwardly, should the operator wish to instantly reverse its direction of movement, he rocks the lever 249 against the balancing effect of the springs 250 whereby to shift the actuator 350 of the switch 248 to move the contact 327 of said switch from circuit closing relation with the contact 329 thereof into circuit closing relation with the contact 328 thereof. Now we have a circuit from the wire 310 through the branch 326, contact 327, contact 328, wire 337 and wire 336 to the coil 338 of solenoid 305. Such solenoid being energized, the valve part 346 is instantly reversed and the direction of movement of the head is changed from an upward to a downward movement.

In somewhat like manner, if the head is moving downwardly and it is desired to instantly reverse it and move it upwardly, the operator actuates the lever 249 to shift the actuator 351 of switch 247 whereby to move the contact 323 of said switch from circuit closing engagement with the contact 325 thereof and into circuit closing engagement with the contact 324 thereof. Now instantly we have a circuit from the wire 310 through contact 323, contact 324 and a wire 352 to the wire 347 and thus to the coil 342 of solenoid 343. This would reverse the position of the movable valve part 346 to change the movement of the tool head from a downward to an upward movement.

It is noted that when the movable switch contacts 323 or 327 are moved from their normal positions they open the normal path of current through the switches 247 and 248 to the respective solenoids and thus when the lever 249 is used, there is no bucking of the action of one solenoid by that of the other. With the tool head moving upwardly, should the operator desire to have the tool head move upwardly beyond the position which it could attain in the setting in use, he actuates lever 249 to move contact 323 of switch 247 from contact 325 into engagement with contact 324. This energizes the coil 342 of solenoid 343 but nothing is accomplished by such an action at this time as the valve part 346 is already in the desired position. However, such actuation of the switch opens the circuit through the wire 330 and now when the finger 238 of rod 239 engages actuator 348 of switch 236 and moves contact 331 against contact 332, there is no energizing of the solenoid coil 338 as contact 325 of switch 247 is unenergized. Thus, while the operator holds the lever in the desired position, the tool head will continue to move upwardly beyond the limit as determined by the adjustment of the rods 239 and 240.

When it is desired to bring the tool head back down into the operating range, the operator shifts lever 249 in the opposite direction engaging actuator 350 of switch 248 and shifting contact 327 from engagement with contact 329 into engagement with contact 328. Now the circuit is through the latter and the wire 337 to wire 336 and to the coil 338 of solenoid 305 whereby the valve part 346 is reversed and the air exhausted from above the pistons and supplied to the cylinders below the pistons to shift the tool head downwardly. Excessive downward movement may be accomplished by holding the lever 249 in the described position since at such times solenoid coil 342 may not be energized because the contact 329 of switch 248 is dead and thus the wire 333 cannot supply current to contact 334 of switch 237 and therefore closing of said switch by the pin 238 of rod 240 engaging switch actuator 349 cannot bring about energizing of the coil of solenoid 343.

Having thus set forth the nature of my invention, what I claim is:

1. In a machine tool, a base, a table supported on said base for adjustment in a horizontal plane, a column on said base at one side of said table and extending above the latter, a tool head including a vertical main spindle, means mounting said tool head on said column for reciprocation thereon above said table, means for vertically reciprocating said main spindle relative to said column, a tool holder on the lower end of said spindle and radially adjustable relative thereto, means for rotating said tool holder independent of said spindle and about its own axis, a motor in said column, a drive from said motor to said spindle, and said drive including a flexible shaft having one end driven by said motor and then extending through the upper end of said column and looped upon itself and having its other end portion connected to drive said spindle.

2. In a machine tool, a base, a table supported on said base for adjustment in a horizontal plane, a column on said base at one side of said table and extending above the latter, vertical ways on said column, a tool head including a vertical main spindle, means mounting said tool head on said column for adjustment along said ways in locations above said table, means in said tool head for vertically reciprocating said main spindle relative to said column, a tool holder on the lower end of said spindle and radially adjustable relative thereto, means for rotating said tool holder independent of said spindle and about its own axis, a motor in said column, a drive from said motor to said spindle, said drive including a flexible shaft connected at one end to be driven by said motor and at its other end to drive said spindle, and said shaft intermediate its ends of a length to maintain a driving connection between said motor and spindle as said means reciprocates said main spindle and on vertical adjustment of said tool head on said column.

3. In a machine tool, a base, a table supported on said base for adjustment in a horizontal plane, a column on said base at one side of said table and extending above the latter, vertical ways on said column, a tool head including a vertical main spindle, means mounting said tool head on said column for adjustment along said ways in locations above said table, means in said tool head for vertically reciprocating said main spindle relative to said column, a tool holder on the lower end of said spindle and radially adjustable relative thereto, means for rotating said tool holder independent of said spindle and about its own axis, a motor in said column, a drive from said motor to said spindle, said drive including a flexible shaft connected at one end to be driven by said motor and at its other end to drive said spindle, and said shaft intermediate its ends looped through 180° arc whereby to maintain a driving connection between said motor and spindle as said means reciprocates said main spindle and on vertical adjustment of said tool head on said column.

4. In a machine tool, a work support, a tool head, means mounting said tool head above said work support, said tool head including a mounting yoke and a main spindle reciprocable with said yoke toward and from said work support, means for reciprocating said yoke and thus said spindle, said means including a pair of air cylinders and a hydraulic cylinder between said air cylinders, a piston in each of said cylinders, piston rods connecting the pistons in the air cylinders with said means mounting the tool head, a piston rod extending entirely through the hydraulic cylinder and therein rigidly connected with the piston therein, said last mentioned piston rod connected at one end with said mounting means, means for alternately supplying compressed air to and exhausting it from opposite ends of said air cylinders to reciprocate said yoke and main spindle, a closed hydraulic system including said hydraulic cylinder and a passageway between the opposite ends of said hydraulic cylinder, an adjustable metering orifice controlling movement of liquid through said passageway from one end of said hydraulic cylinder to the other thereof and thereby the rate of movement of said main spindle by the pistons in said air cylinders, a tool holder on the lower end of said spindle and eccentrically adjustable relative thereto, and means for rotating said tool holder independently of said spindle.

5. In a machine tool, a work support, a tool head, means mounting said tool head above said work support, said tool head including a mounting yoke and a main spindle reciprocable with said yoke toward and from said work support, means for reciprocating said yoke and thus said spindle, said means including a pair of air cylinders and a hydraulic cylinder between said air cylinders, a piston in each of said cylinders, piston rods connecting the pistons in the air cylinders with said means mounting the tool head, a piston rod extending entirely through the hydraulic cylinder and therein rigidly connected with the piston therein, said last mentioned piston rod connected at one end with said mounting means, means for alternately supplying compressed air to and exhausting it from opposite ends of said air cylinders to reciprocate said yoke and main spindle, a closed hydraulic system including said hydraulic cylinder and a passageway between the opposite ends of said hydraulic cylinder, an adjustable metering orifice controlling movement of liquid through said passageway from one end of said hydraulic cylinder to the other thereof and thereby the rate of movement of said main spindle by the pistons in said air cylinders, an electric motor, a flexible drive shaft connecting said motor with said spindle to rotate the spindle as it is reciprocated, a tool holder on the lower end of said spindle and eccentrically adjustable relative thereto, and means for rotating said tool holder independently of said spindle.

6. In a machine of the class described, a work support a tool head, means mounting said tool head above said work support, said tool head including a spindle reciprocable toward and from said work support, means for reciprocating said spindle including an air cylinder, a piston in said air cylinder, a piston rod connecting said piston with the means mounting the tool head, a closed hydraulic system including a cylinder and a passage connecting the outer ends of said cylinder outwardly of the latter, said hydraulic cylinder parallel with the first mentioned cylinder, both said cylinders connected to reciprocate with said spindle, a piston in said hydraulic cylinder, a rod connected with the last mentioned piston and said means mounting the tool head, means to alternately supply compressed air to and exhaust it from opposite ends of said air cylinder to reciprocate said spindle, an adjustable metering valve in said passage connecting the ends of said hydraulic cylinder for controlling the rate of flow of liquid in said closed hydraulic system from one end of said cylinder to the other thereof and thus the rate of movement of said spindle by the air cylinder and piston, means for rotating said spindle, a tool holder on the lower end of said spindle and eccentrically adjustable relative thereto, and means for rotating said tool holder independently of said spindle.

7. In a machine of the class described, a work support, a tool head, means mounting said tool above said work support, said tool head including a spindle reciprocable toward and from said work support, means for reciprocating said spindle including an air cylinder, a piston on said air cylinder, a piston rod connecting said piston with the means mounting the tool head, a closed hydraulic system including a cylinder and a passage connecting the outer ends of said cylinder outwardly of the latter, said hydraulic cylinder parallel with the first mentioned cylinder, both said cylinders connected to reciprocate with said spindle, a piston in said hydarulic cylinder, a rod connected with the last mentioned piston and said means mounting the tool head, means to alternately supply compressed air to and exhaust it from opposite ends of said air cylinder to reciprocate said spindle, an adjustable metering valve in said passage connecting the ends of said hydraulic cylinder for controlling the rate of flow of liquid in said closed hydraulic system from one end of said cylinder to the other thereof and thus the rate of movement of said spindle by the air cylinder and piston, an electric motor, a flexible drive shaft connecting said motor with said spindle to rotate the spindle as it is reciprocated, a tool holder on the lower end of said spindle and eccentrically adjustable relative thereto, and means for rotating said tool holder independently of said spindle.

8. In a machine tool, a work support, a tool head, means mounting said tool head for adjustment toward and from said work support, said tool head including a mounting yoke and a main spindle reciprocable with said yoke toward and from said work support, means for reciprocating said yoke and thus said spindle, said means including a pair of air cylinders and a hydraulic cylinder between said air cylinders, a piston in each of said cylinders, piston rods connecting the pistons in the air cylinders with said means mounting the tool head, a piston rod extending entirely through the hydraulic cylinder and therein rigidly connected with the piston therein, said last mentioned piston rod connected at one end with said mounting means, means for alternately supplying compressed air to and exhausting it from opposite ends of said air cylinders to reciprocate said yoke and main spindle, a closed hydraulic system including said hydraulic cylinder and a passageway between the opposite ends of said hydraulic cylinder, and adjustable metering orifice controlling movement of liquid through said passageway from one end of said hydraulic cylinder to the other thereof and thereby the rate of movement of said main spindle by the pistons in said air cylinders, and a valve controlled by-pass about said metering orifice for permitting of unrestricted flow of liquid from one end of said hydraulic cylinder to the other thereof for permitting of hand feeding of said yoke and main spindle toward and from said work support.

9. In a machine tool, a work support, a tool head, means mounting said tool head for adjustment toward and from said work support, said tool head including a mounting yoke and a main spindle reciprocable with said yoke toward and from said work support, means for reciprocating said yoke and thus said spindle, said means including a pair of air cylinders and a hydraulic cylinder between said air cylinders, a piston in each of said cylinders, piston rods connecting the pistons in the air cylinders with said means mounting the tool head, a piston rod extending entirely through the hydraulic cylinder and therein rigidly connected with the piston therein, said last mentioned piston rod connected at one end with said mounting means, means for alternately supplying compressed air to and exhausting it from opposite ends of said air cylinders to reciprocate said yoke and main spindle, an electric motor, a flexible drive shaft connecting said motor with said spindle to rotate the spindle as it is reciprocated, a closed hydraulic system including said hydraulic cylinder and a passageway between the opposite ends of said hydraulic cylinder, a metering orifice controlling movement of liquid through said passageway from one end of said hydraulic cylinder to the other thereof and thereby the rate of movement of said main spindle by the pistons in said air cylinders, and a valve controlled by-pass about said metering orifice for permitting of unrestricted flow of liquid from one end of said hydraulic cylinder to the other thereof for permitting of hand feeding of said yoke and main spindle toward and from said work support.

10. In a hydraulic apparatus, a cylinder, a piston in said cylinder, a rod rigid with said piston and extending from opposite sides of said piston and through opposite ends of said cylinder, a passage connecting the opposite ends of said cylinder, a pair of spaced seals about said portions of said piston rod beyond the opposite ends of said cylinder, a chamber between each of said pairs of seals and located one about each of said piston rods, a passage connecting said chambers, and means to supply liquid under pressure to the system including said chambers and the passage connecting them.

11. In a hydraulic apparatus, a cylinder, a piston in said cylinder, a rod rigid with said piston and extending from opposite sides of said piston and through opposite ends of said cylinder, a passage connecting the opposite ends of said cylinder, power means for causing relative movements of said cylinder and piston to displace liquid through said passage from one end to the other of said passage, an adjustable metering orifice controlling movement of liquid through said passage, a pair of spaced seals about said portions of said piston rod beyond the opposite ends of said cylinder, a chamber between each of said pairs of seals and located one about each of said piston rods, a passage connecting said chambers, and means to supply liquid under pressure to the system including said chambers and the passage connecting them.

12. In a hydraulic apparatus, a cylinder, a piston in said cylinder, a rod rigid with said piston and extending from opposite sides of said piston and through opposite ends of said cylinder, a passage connecting the opposite ends of said cylinder, power means for causing relative movements of said cylinder and piston to displace liquid through said passage from one end to the other of said passage, an adjustable metering orifice controlling movement of liquid through said passage, a pair of spaced seals about said portions of said piston rod beyond the opposite ends of said cylinder, a chamber between each of said pairs of seals and located one about each of said piston rods, a passage connecting said chambers, means to supply liquid under pressure to the system including said chambers and the passage connecting them, and means including a metering orifice of fixed size connecting the last mentioned system in the system including said hydraulic cylinder and the passage connecting its ends.

13. In a hydraulic apparatus, a cylinder, a piston in said cylinder, a rod rigid with said piston and extending from opposite sides of said piston and extending through opposite ends of said cylinder, a passage connecting the opposite ends of said cylinder, a pair of spaced seals about said portions of said piston rod beyond the opposite end of said cylinder, a chamber between each of said pairs of seals and located one about each of said piston rods, a passage connecting said chambers, means to supply liquid under pressure to the system including said chambers and the passage connecting them, and a connection including a restricted orifice between said system and a system including the respective end portions of said cylinder and the passage connecting said end portions.

14. In a hydraulic apparatus, a cylinder, a piston in said cylinder, a rod rigid with said piston and extending from opposite sides of said piston and extending through opposite ends of said cylinder, a passage connecting the opposite ends of said cylinder, power means for causing relative movements of said cylinder and piston to displace liquid through said passage from one end to the other of said passage, an adjustable metering orifice controlling movement of liquid through said passage, a pair of spaced seals about said portions of said piston rod beyond the opposite end of said cylinder, a chamber between each of said pairs of seals and located one about each of said piston rods, a passage connecting said chambers, means to supply liquid under pressure to the system including said chambers and the passage connecting them, and a connection including a restricted orifice between said system and a system including the respective end portions of said cylinder and the passage connecting said end portions.

15. In a machine tool, a work support, a tool head including a spindle reciprocable toward and from said work support, a tool movable with said spindle and means to drive said tool, a piston and cylinder construction mounted by said tool head and including a movable part connected with said spindle, a valve controlling the admission of fluid under pressure to and the exhausting of fluid from opposite ends of said cylinder alternatively, a solenoid controlling said valve, limit switches on a part of said machine not reciprocable with said spindle, means for alternatively operating said switches to reverse said valve at the end of each stroke of said spindle, said last means including a pair of racks mounted for reciprocation with and for longitudinal adjustment relative to said spindle, and manually operable means including pinions individual to and meshing with the teeth of the respective racks for adjusting them longitudinally and holding them in their adjusted positions.

16. In a machine tool, a work support, a tool head including a spindle reciprocable toward and from said work support, a tool movable with said spindle and means to drive said tool, a piston and cylinder construction mounted by said tool head and including a movable part connected with said spindle, a valve controlling the admission of fluid under pressure to and the exhausting of fluid from opposite ends of said cylinder alternatively, a solenoid controlling said valve, limit switches on a part of said machine not reciprocable with said spindle, adjustable means movable with said spindle for alternatively operating said switches to reverse said valve at the end of each stroke of said spindle, a second pair of limit switches on said machine and wired across the respective first mentioned switches for cutting out the latter on closing of the switches of the second pair, and means manually operable to selectively close the swiches of the second pair.

17. In a machine tool, a work holder, a tool head including a spindle reciprocable toward and from said work holder, a piston and cylinder construction including a movable part connected to said spindle, a distributing valve controlling the alternate admission and exhaust of air to opposite ends of the cylinder of said construction for reciprocating said spindle, a second cylinder and piston construction including a movable part connected with said spindle, a closed hydraulic system including cylinder portions at opposite sides of the piston of the second mentioned cylinder and piston construction and a passage between the opposite outer ends of the cylinder portions and an adjustable metering orifice in said passage and controlling the rate of movement of liquid therethrough from one end of the cylinder to the other as said piston is reciprocated in the cylinder portions on reciprocation of said spindle, a bypass about said metering orifice, a pressure operated valve controlling said bypass, a control valve controlling the supply of fluid pressure to and the exhaust from said pressure operated valve and said distributing valve and movable between open and closed positions, means to open said control valve to exhaust fluid from the cylinder of the first mentioned cylinder and piston construction and said pressure operated valve to render said piston and cylinder construction ineffective and said bypass wide open, and manually operable means for then reciprocating said spindle.

18. In a machine tool, a work holder, a tool head including a spindle reciprocable toward and from said work holder, a piston and cylinder construction in said tool head and including a movable part connected to said spindle, a distributing valve controlling the alternate admission and exhaust of air to opposite ends of the cylinder of said construction for reciprocating said spindle, a second cylinder and piston construction including a movable part connected with said spindle, a closed hydraulic system including cylinders at opposite sides of a piston and a passageway between the opposite outer ends of the cylinder and a metering orifice in said passage and controlling the rate of movement of liquid therethrough from one end of the cylinder to the other as relative reciprocation of said cylinder and piston takes place, a bypass about said metering orifice, a pressure operated valve controlling said bypass, a control valve controlling the supply of fluid pressure to and the exhaust from said pressure operated valve and said distributing valve and movable between open and closed positions, means to open said control valve to exhaust fluid from the cylinder of the first mentioned cylinder and piston construction and said pressure operated valve to render said piston and cylinder construction ineffective and said bypass wide open, a pair of parallel bars rigid with said housing, rack teeth on said bars, a shaft crossing said bars, pinions on said shaft and meshing with said rack teeth, and a manual connected with said shaft for rotating the same in the selected directions to reciprocate said bars and thereby said housing when said control valve is opened.

19. In a machine tool, a work support, a tool head including a spindle, a column on which said tool head is mounted above said work support, means in said tool head for reciprocating said spindle toward and from said work support, a motor in said column, a flexible shaft bent through a loop of 180° and connected at one end to be driven by said motor and at its other end through a clutch to drive said spindle, a worm gear connected to rotate with said spindle, a shaft tangental to said worm gear and shiftable longitudinally, a worm on said shaft, means to disconnect said clutch, means to shift said shaft to bring said worm into mesh with said worm gear, means to rotate said shaft and thereby said spindle while said clutch is disconnected, and means to latch said shaft in a shifted position with said worm spaced from said worm gear when said clutch is connected to drive said spindle.

20. In a machine tool, a work support, a tool head including a spindle, a column on which said tool head is mounted above said work support, means in said tool head for reciprocating said spindle toward and from said work support, a motor in said column, a flexible shaft bent through a loop of 180° and connected at one end to be driven by said motor and at its other end through a clutch to drive said spindle, a worm gear connected to rotate with said spindle, a shaft tangental to said worm gear and shiftable longitudinally, a worm on said shaft, means to disconnect said clutch, means to shift said shaft to bring said worm into mesh with said worm gear, a means to rotate said shaft and thereby said spindle while said clutch is disconnected, a ring fixed to said spindle, a stop adjustable about said ring, fixed stops to be engaged alternatively by said adjustable stop as said spindle is turned first in one direction and then in the other on operation of said hand wheel, and means to latch said shaft in a shifted position with said worm spaced from said worm gear when said clutch is connected.

21. In a machine tool, a base, a horizontal table on said base, a column on said base and extending higher than said table, a tool head including a spindle on said column with said spindle over said table, a cylinder and piston construction on said tool head for vertically reciprocating said spindle, a line for alternately supplying fluid under pressure to and exhausting it from the opposite ends of said cylinder to reciprocate said spindle, a counterbalancing piston and cylinder construction on said tool head, means for supplying line pressure to the cylinder of said second mentioned cylinder and piston construction, a regulating valve connected in said line to admit air to the cylinder of the second mentioned cylinder and piston construction on upward movement of said spindle to maintain the pressure therein constant and to exhaust pressure therefrom on downward movement of the spindle while maintaining the pressure in the said cylinder constant, an accumulator connected to supply air to the cylinder of the second mentioned construction, and a check valve to prevent movement of fluid under pressure from the accumulator except to said cylinder.

22. In a machine tool, a base, a horizontal table on said base, a column on said base and extending higher than said table, a tool head including a spindle on said column with said spindle over said table, a cylinder and piston construction on said tool head for vertically reciprocating said spindle, a line for alternately supplying fluid under pressure to and exhausting it from the opposite ends of said cylinder to reciprocate said spindle, a counterbalancing piston and cylinder construction on said tool head, means for supplying line pressure to the cylinder of said second mentioned cylinder and piston construction, a regulating valve connected in said line to admit air to the cylinder of the second mentioned cylinder and piston construction on upward movement of said spindle to maintain the pressure therein constant and to exhaust pressure therefrom on downward movement of the spindle while maintaining the pressure in the said cylinder constant, an accumulator connected to supply air to the cylinder of the second mentioned construction, a check valve to prevent movement of fluid under pressure from the accumulator except to said cylinder, and a closed hydraulic circuit controlling the rate of movement of said spindle by the first mentioned cylinder and piston construction.

23. In a machine tool, a base, a table supported on said base for adjustment in a horizontal plane, a column on said base at one side of said table and extending above the latter, a tool head including a vertical main spindle, means mounting said tool head on said column above said table, means for vertically reciprocating said main spindle relative to said column, a tool holder on the lower end of said spindle and radially adjustable relative thereto, means for rotating said tool holder independently of said spindle and about its own axis, a motor in said column, a drive from said motor to said spindle, said drive including a flexible shaft connected at one end to be driven by said motor and at its other end to drive said spindle, and said shaft intermediate its ends looped through substantially 180° whereby to maintain a driving connection between said motor and spindle as said means reciprocates said spindle.

24. In a machine tool, a work support, a tool head, means mounting said tool head above said work support, said tool head including a mounting member and a main spindle reciprocable with said member toward and from said work support, means for reciprocating said member and thus said spindle, said means including a pair of air cylinder and piston constructions and a hydraulic cylinder and piston construction between said air cylinders, one of the piston and cylinder of each of said constructions connected with said means mounting the tool head, the piston rod of the hydraulic cylinder and piston construction extending entirely through the cylinder of said construction and therein rigidly connected with the piston thereof, means for alternately supplying compressed air to and exhausting it from opposite ends of said air cylinder and piston constructions to reciprocate said member and main spindle, a closed hydraulic system including said hydraulic cylinder and piston construction and a passageway between the opposite ends of the cylinder of said hydraulic cylinder and piston construction, a metering means controlling movement of liquid through said passageway from one end of said cylinder of said hydraulic cylinder and piston construction to the other end thereof and thereby the rate of movement of said main spindle by the air cylinder and piston constructions, means for rotating said spindle, a tool holder on the lower end of said spindle and eccentrically adjustable relative thereto, and means for rotating said tool holder on its own axis independently of said spindle.

25. In a machine tool, a work support, a tool head including a spindle, a column on which said tool head is mounted above said work support, means for reciprocating said spindle toward and from said work support, a motor connected through a clutch to drive said spindle a tool holder on and eccentric with respect to the lower end of said spindle, a worm gear connected to rotate with said spindle, a shaft tangential to said worm gear and shiftable longitudinally, a worm on said shaft, means to disconnect said clutch, means to shift said shaft to bring said worm into mesh with said worm gear, means to rotate said shaft and thereby said spindle while said clutch is disconnected, and means to latch said shaft in a shifted position with said worm spaced from said worm gear when said clutch is connected to drive said spindle.

26. In a machine tool, a work support, a tool head including a spindle, a column on which said tool head is mounted above said work support, means for reciprocating said spindle toward and from said work support, a motor connected through a clutch to drive said spindle, a tool holder on an eccentric with respect to the lower end of said spindle, a worm gear connected to rotate with said spindle, a shaft tangential to said worm gear and shiftable longitudinally, a worm on said shaft, means to disconnect said clutch, means to shift said shaft to bring said worm into mesh with said worm gear, means to rotate said shaft and thereby said spindle while said clutch is disconnected, a ring fixed to said spindle, a stop adjustable about said ring, fixed stops to be engaged alternatively by said adjustable stop as said spindle is turned first in one direction and then in the other on operation of said means to rotate said shaft, and means to latch said shaft in a shifted position with said worm spaced from said worm gear when said clutch is connected.

FREDERICK C. VICTORY.

REFERENCES CITED

The following references are of record in the file of this patent:

UNITED STATES PATENTS

| Number | Name | Date |
| --- | --- | --- |
| 1,010,565 | Ahlberg | Dec. 5, 1911 |
| 1,606,652 | Marvin et al. | Nov. 9, 1926 |
| 1,674,673 | Williams | June 26, 1928 |
| 1,950,936 | Baumberger | Mar. 13, 1934 |
| 1,962,459 | Ostlund | June 12, 1934 |
| 1,998,873 | Kingsbury | Apr. 23, 1935 |
| 2,235,924 | Gignoux | Mar. 25, 1941 |
| 2,299,123 | Galsiger | Oct. 20, 1942 |
| 2,428,971 | Hauser | Oct. 14, 1947 |